US011299090B2

(12) United States Patent
Werner et al.

(10) Patent No.: US 11,299,090 B2
(45) Date of Patent: Apr. 12, 2022

(54) REMOTE LIGHTING SYSTEM OPERABLE TO CORRESPOND WITH VEHICLE LIGHTING

(71) Applicant: Third Eye Design, Inc., Pittsford, NY (US)

(72) Inventors: David R. Werner, Pittsford, NY (US); David Zima, Sorrento, FL (US); John M. Hammond, Livonia, NY (US)

(73) Assignee: Third Eye Design, Inc., Pittsford, NY (US)

( * ) Notice: Subject to any disclaimer, the term of this patent is extended or adjusted under 35 U.S.C. 154(b) by 143 days.

(21) Appl. No.: 16/618,344

(22) PCT Filed: Jun. 1, 2018

(86) PCT No.: PCT/US2018/035547
§ 371 (c)(1),
(2) Date: Nov. 30, 2019

(87) PCT Pub. No.: WO2018/222961
PCT Pub. Date: Dec. 6, 2018

(65) Prior Publication Data
US 2021/0138956 A1    May 13, 2021

Related U.S. Application Data

(60) Provisional application No. 62/514,380, filed on Jun. 2, 2017.

(51) Int. Cl.
*B60Q 1/26* (2006.01)
*A42B 3/04* (2006.01)
(Continued)

(52) U.S. Cl.
CPC .......... *B60Q 1/2676* (2013.01); *A42B 3/0453* (2013.01); *B60Q 1/38* (2013.01); *B60Q 1/445* (2013.01); *B60Q 2900/30* (2013.01)

(58) Field of Classification Search
CPC ........ B60Q 1/2676; B60Q 1/38; B60Q 1/445; B60Q 2900/30; B60Q 1/447; B60Q 1/46;
(Continued)

(56) References Cited

U.S. PATENT DOCUMENTS

| 4,559,516 A | 12/1985 | Schott et al. |
| 4,648,131 A | 3/1987 | Kawaguchi et al. |

(Continued)

FOREIGN PATENT DOCUMENTS

WO    2017013671 A1    1/2017

OTHER PUBLICATIONS

Appl. No. PCT/US2018/035547 International Search Report dated Dec. 4, 2018. EFS file name: 20210412_16-618344_IDS_NPL_Cite_1.

(Continued)

*Primary Examiner* — Renan Luque
(74) *Attorney, Agent, or Firm* — John M. Hammond; Patent Innovations LLC

(57) ABSTRACT

A remote lighting system for a safety helmet operable with a vehicle lighting system. The system includes a vehicle portion and a helmet portion comprising a helmet brake light; a microcontroller in communication with the brake light; and a helmet transceiver in communication with the microcontroller. The vehicle portion includes a vehicle transceiver in wireless communication with the helmet transceiver; a gate in communication with the vehicle transceiver, and under a condition when a signal is received from the vehicle transceiver, operable to electrically connect the battery to the brake light of the vehicle lighting system; and an accelerometer in communication with the vehicle transceiver, and operable to send a signal indicative of vehicle acceleration to the vehicle transceiver. When a threshold level of deceleration is exceeded, the microcontroller sends (Continued)

a signal to the transceivers and the gate, causing a brake light of the vehicle lighting system to be illuminated.

20 Claims, 13 Drawing Sheets

(51) Int. Cl.
*B60Q 1/38* (2006.01)
*B60Q 1/44* (2006.01)

(58) Field of Classification Search
CPC ...... B60Q 1/44; B60Q 1/2673; A42B 3/0453; A42B 3/30; A42B 3/044; A42B 3/046; F21S 9/02; F21V 23/0442; F21V 33/0004
See application file for complete search history.

(56) References Cited

U.S. PATENT DOCUMENTS

| | | | |
|---|---|---|---|
| 4,760,373 A | 7/1988 | Reilly | |
| 4,769,629 A | 9/1988 | Tigwell | |
| 4,956,752 A | 9/1990 | Foglietti | |
| 5,040,099 A | 8/1991 | Harris | |
| 5,072,209 A | 12/1991 | Hori et al. | |
| 5,353,008 A | 10/1994 | Eikenberry et al. | |
| 5,477,209 A | 12/1995 | Benson, Jr. et al. | |
| 5,704,707 A | 1/1998 | Gebelein et al. | |
| 5,910,764 A | 6/1999 | Hayden | |
| 6,348,859 B1 | 2/2002 | Baker | |
| 6,406,168 B1 | 6/2002 | Whiting | |
| 6,933,839 B2 | 8/2005 | Henry | |
| 7,129,826 B2 | 10/2006 | Nitz et al. | |
| 7,218,214 B2 | 5/2007 | Werner et al. | |
| 7,857,479 B1 | 12/2010 | Maroquin | |
| 8,441,347 B2 * | 5/2013 | Marlowe | B60Q 1/445 701/79 |
| 8,807,778 B1 | 8/2014 | Latchman et al. | |
| 8,941,482 B1 | 1/2015 | Gouverneur | |
| 10,358,082 B1 * | 7/2019 | Kinney | B60Q 1/302 |
| 2009/0261963 A1 * | 10/2009 | Ault | B60Q 1/44 340/467 |
| 2010/0134272 A1 | 6/2010 | Palacios | |
| 2010/0253501 A1 | 10/2010 | Gibson | |
| 2013/0093585 A1 | 4/2013 | Ambani | |
| 2014/0104055 A1 * | 4/2014 | Boutte | A42B 3/0453 340/468 |
| 2014/0210609 A1 | 7/2014 | Yang | |
| 2015/0305426 A1 | 10/2015 | Lee et al. | |
| 2016/0144773 A1 * | 5/2016 | Alataas | A42B 3/0453 340/475 |
| 2016/0309826 A1 * | 10/2016 | Anderson | A42B 3/0453 |
| 2018/0009372 A1 * | 1/2018 | Hammock | B60Q 1/0094 |

OTHER PUBLICATIONS

Appl. No. PCT/US2018/035547 Written Opinion dated Dec. 4, 2018. EFS file name: 20210412_16-618344_IDS_NPL_Cite_2.

* cited by examiner

# REMOTE LIGHTING SYSTEM OPERABLE TO CORRESPOND WITH VEHICLE LIGHTING

TECHNICAL FIELD

Remote lighting that is operable to coincide with corresponding lighting on a vehicle and optionally, with deceleration of the vehicle. In particular, a lighting system, which is attachable to a safety helmet, and which is operable to correspond with lighting on a powersport vehicle and with deceleration of the vehicle.

BACKGROUND ART

Motorcycle and powersport riding is a necessary means of transportation for some, and an enjoyable pastime for others. It is estimated that there are about 9.8 million registered motorcyclists and snowmobilers in the United States who ride about a billion miles annually, more than 40 million riders in the EU and hundreds of millions more in Asia, India, Mexico and other countries worldwide who ride billions of miles annually. Regardless of whether powersport riding is done of necessity, or as an avocation, it is a dangerous means of transportation.

One of the major risks in motorcycle riding is the risk of a rear-end or side collision, i.e., the risk to the motorcycle rider being struck from the rear or side by another vehicle. One of the main reasons that this risk is high is due to relative lack of visibility of the motorcycle and rider. Human depth perception is affected when motorcycles are viewed among much bigger cars and trucks, causing the motorcycle to be perceived by the operator of a following vehicle to be farther away than it actually is. Additionally, a motorcycle typically includes only a single array of running, brake, and signal lights mounted at only about two to three feet above ground level. This is in comparison to passenger car and truck lighting, provided in separated left/right pairs typically at three to four feet above ground level, and usually augmented by a Center High Mounted Stop Lamp (CHMSL), which is mandatory by law on passenger vehicles manufactured since 1986. Additionally, since motorcycles make up only 3 percent of registered vehicles (as per U.S. Department of Transportation 2014 Publication No. DOT HS 812 292, "Traffic Safety Facts"), cars and trucks on public highways outnumber motorcycles significantly. In view of these facts, it is not surprising that a rear end or side collision is a major risk to motorcycle riders. Studies from around the world prove that motorcycles get hit in crashes often because they are not seen; see *Motorcycle Accident Cause Factors and Identification of Countermeasures*, Volume 1: Technical Report, Hurt et al., Traffic Safety Center, University of Southern California, Los Angeles, Calif. 90007, Contract No. DOT HS-5-01160, January 1981 (Final Report); and Comparative analysis of motorcycle accident data from OTS and MAIDS, McCarthy et al., ISBN 978-1-84608-751-6, October 2008.

Attempts have been made to increase the visibility of a motorcycle and rider by providing a remotely operated auxiliary light or lighting system that can be worn by the rider of the motorcycle, typically mounted on the back of the safety helmet of the rider. For example, commonly owned U.S. Pat. No. 7,218,214 of Werner et al., the disclosure of which is incorporated herein by reference, discloses an auxiliary safety lighting system that is remotely operated by wireless H-field backscatter signal communication. Other patents and published patent applications also disclose remotely operated lighting.

Additionally, some motorcycle helmet remote lighting products have been introduced into the commercial marketplace. None of these commercial products have achieved broad sales, acceptance, and use in the marketplace. At first glance, that might seem odd; with the broad array of wireless communication technologies now in common use, intuitively one would think it to be a simple matter to get motorcycle lighting to wirelessly "talk" to helmet lighting and operate it. However, that has turned out not to be the case. The Applicants believe that current and previously offered helmet lighting products have not achieved commercial success because none of the products has simultaneously solved a broad array of problems, and none has been able to satisfy a broad range of customer and regulatory requirements, which are often in conflict with each other.

These problems and unsatisfied requirements can be grouped into three general categories: technical, customer driven, and regulatory. More specifically, the problems and unsatisfied requirements are summarized in further detail as follows:

Technical Problems and Requirements

In general, motorcycles on the road today have lighting systems that may be considered as falling in one of two categories: analog lighting, and digital lighting.

Motorcycles with analog lighting are older motorcycles, manufactured before about 2012. Their lighting is comprised of a battery, incandescent light bulbs, and mechanical switches that turn the light bulbs on and off. In some instances, the lighting elements may be light emitting diodes (LEDs) with voltage control as needed, but the overall operation of the lighting is still by mechanical switches. Although most new motorcycles are no longer sold with analog tail lighting, a large number of "legacy" motorcycles remain in use today, and their owners do not want to "give them up." Therefore, there is a need in the marketplace that any remote auxiliary lighting system must operate with such motorcycles.

Motorcycles with digital lighting are newer motorcycles, which often use a Controller Area Network (CAN-Bus) to operate and control a range of components on a motorcycle, including the lighting. Motorcycles that use CAN-Bus-operated wiring were first sold around 2012. In general, CAN-Bus is a vehicle bus standard designed to enable on-board vehicle microcontrollers and devices to communicate with each other in applications without a host computer. CAN-Bus was designed originally for multiplex electrical wiring within automobiles, but has also come into wide use on motorcycles and other powersport vehicles. With each passing year, more and more motorcycles and powersport vehicles use CAN-Bus control of lighting and other components.

Although CAN-Bus protocols and specifications are defined according to certain standards, the manner in which CAN-Bus is used on motorcycles varies widely among motorcycle manufacturers and even year of manufacture. Moreover, manufacturers are quite secretive regarding software, firmware, and numerical signal values used in communications within their respective control systems, including lighting control. Manufacturers consider such information to be proprietary. Additionally, the lighting circuit architecture, i.e., how the motorcycle lighting is connected to the CAN-Bus, varies among manufacturers.

Thus an auxiliary remote lighting system must be configured to be connectable to a variety of CAN-Bus operated motorcycles, and work effectively with each motorcycle. The system cannot simply be configured to operate with a "universal" CAN-Bus motorcycle system, because such a system does not exist. Again, while meeting this need for adaptability to various CAN-Bus driven motorcycle lighting configurations, the auxiliary remote lighting system must also be adaptable to analog motorcycle lighting as described above.

Customer-Driven Problems and Requirements

In today's "connected" world, customers want simplicity and versatility, instantly. In terms of an auxiliary remote lighting system for a motorcycle helmet, some of the key requirements are as follows:

Customers want long battery life, with minimal actions on their part to achieve it. A remote lighting system need to draw as little power as possible while still functioning. Additionally, the system needs "sleep" and "wake" capability. When a ride starts, a customer does not want to have to remember to turn a system on to provide functionality. When a ride is finished, a customer does not want to have to remember to turn the system off in order to avoid draining the battery, and then discovering that the battery is dead at the start of the next ride. Nor does a customer want to deal with frequent recharging or battery replacement.

Some customers want the capability to carry a passenger, with the passenger's helmet light being operable (since the passenger is on the back of the motorcycle), and the driver's helmet light turned off so that it is not directed into the passenger's eyes.

Some customers own and ride more than one motorcycle. Additionally, one of the motorcycles may be older and have analog lighting, and the other motorcycle may be newer with digital lighting. The customer wants the helmet remote lighting system to function properly, regardless of which motorcycle he chooses to ride.

Customers often ride in groups. In cases where multiple riders are wearing helmets with remote lighting systems, there must not be "cross-talk" between systems. Additionally, two customers may exchange motorcycles—"You ride mine and I'll ride yours." The remote lighting systems must recognize the change in riders, and pair up correctly with the new riders.

Regulatory Problems and Requirements

Any remote auxiliary lighting system must be provided with full consideration of the regulatory requirements of the U.S. Department of Transportation for vehicle lighting. Although remote auxiliary lighting is technically not part of a vehicle, and at this time is not explicitly regulated as such, it should be anticipated that regulations may change in the future, and that remote auxiliary lighting may need to meet requirements that are the same or similar to DOT vehicle lighting requirements.

To the best of the Applicants' knowledge, there is no remote auxiliary lighting system which is "universal," i.e., which can be used with all motorcycle analog and digital lighting systems, and which meets the broad range of customer requirements described above, as well as government regulatory requirements. In order to increase motorcycle riders' safety, there remains a need for a remote auxiliary lighting system wearable by a motorcycle rider, which is usable with motorcycles having either analog or digital lighting, and which meets customer requirements and satisfies government regulations.

DISCLOSURE OF THE INVENTION

In accordance with the present disclosure, remote auxiliary lighting systems are provided. Any of the remote lighting systems may be integrated into a safety helmet.

In one aspect of the present disclosure, a remote auxiliary lighting system for a safety helmet operable in conjunction with a vehicle lighting system is provided. The vehicle lighting system is comprised of a battery, an optional left directional light, an optional right directional light, and a vehicle brake light. The auxiliary lighting system is comprised of a helmet portion and a vehicle portion. The helmet portion is comprised of a helmet electrical power supply; a helmet lighting unit connected to the power supply and comprising at least a helmet brake light; a microcontroller connected to the power supply and in signal communication with the brake light; and a helmet transceiver in signal communication with the microcontroller. The vehicle portion is comprised of a vehicle transceiver in wireless signal communication with the helmet transceiver; a gate in communication with the vehicle transceiver, and under a condition when an electrical signal is received from the vehicle transceiver, operable to electrically connect the battery to the brake light of the vehicle lighting system; and an accelerometer in signal communication with the microcontroller, and operable to send a signal indicative of vehicle acceleration to the microcontroller. The microcontroller is programmed with an algorithm such that when executed, when a threshold level of deceleration is exceeded and communicated to the microcontroller via the vehicle and helmet transceivers, the microcontroller sends a signal back to the helmet transceiver, and on to the vehicle transceiver, and on to the gate, to electrically connect the battery to the brake light of the vehicle lighting system, and cause the brake light of the vehicle lighting system to be illuminated.

In certain embodiments, when the threshold level of deceleration is exceeded, the microcontroller causes the helmet brake light to be illuminated. In certain embodiments, microcontroller is programmed with an algorithm such that when application of the brake of the vehicle is detected, the microcontroller causes the helmet brake light to be illuminated.

In certain embodiments, the helmet lighting system is further comprised of a left directional light, and a right directional light. In such embodiments, when a left directional switch of the vehicle lighting system is actuated, thereby causing the left directional light of the vehicle to be illuminated, the vehicle transceiver receives electrical power from a second electrical conductor, and transmits a signal indicative of the left directional light being illuminated to the helmet transceiver and to the microcontroller. The microcontroller is programmed with an algorithm such that when vehicle left directional light illumination is detected, the microcontroller causes the left directional light on the helmet to be illuminated. In like manner, when a right directional switch of the vehicle lighting system is actuated, thereby causing the right directional light of the vehicle to be illuminated, the vehicle transceiver receives electrical power from the third electrical conductor, and transmits a signal indicative of the right directional light being illuminated to the helmet transceiver and to the microcontroller. The microcontroller is programmed with an algorithm such that when vehicle right directional light illumination is detected, the microcontroller causes the right directional light on the helmet to be illuminated.

In certain embodiments, the accelerometer may be included in the vehicle portion of the auxiliary lighting system and is in communication with the vehicle transceiver. In such embodiments, the signal indicative of vehicle acceleration from the accelerometer is communicable to the vehicle transceiver, to the helmet transceiver, and to the microcontroller. In other embodiments, the accelerometer may be contained in the safety helmet and may communicate the signal indicative of acceleration directly to the microcontroller.

In certain embodiments, the vehicle brake light of the vehicle lighting system is comprised of a primary brake light and a supplemental brake light. In such embodiments, when the threshold level of deceleration is exceeded, the microcontroller sends a signal to the helmet transceiver, and on to the vehicle transceiver, and on to the gate, to electrically connect the battery to the supplemental brake light, and cause the supplemental brake light to be illuminated.

In another aspect of the present disclosure, an alternative remote auxiliary lighting system for a safety helmet operable in conjunction with a vehicle lighting system is provided. The vehicle lighting system is comprised of a battery, a processor in electrical communication with an optional left directional light, an optional right directional light, and a vehicle brake light. The auxiliary lighting system is comprised of a helmet portion and a vehicle portion. The helmet portion is comprised of a helmet electrical power supply; a helmet lighting unit connected to the power supply and comprising at least a helmet brake light; a microcontroller connected to the power supply and in signal communication with the helmet brake light; and a helmet transceiver in signal communication with the microcontroller. The vehicle portion is comprised of a vehicle transceiver in wireless signal communication with the helmet transceiver; and a first gate in communication with the vehicle transceiver, and connected to an electrical conductor supplying electrical power to the vehicle brake light. The microcontroller is programmed with an algorithm such that when an electrical signal indicative of illumination of the vehicle brake light is communicated through the first gate to the vehicle transceiver, and on to the helmet transceiver, and to the microcontroller, the microcontroller causes the brake light of the vehicle lighting system to be illuminated.

The auxiliary lighting system may be further comprised of a second gate in communication with the vehicle transceiver, and connected to an electrical conductor supplying electrical power to the vehicle left directional light. When an electrical signal indicative of illumination of the vehicle left directional light is communicated through the second gate to the vehicle transceiver, and on to the helmet transceiver, and to the microcontroller, the microcontroller causes the left directional light of the vehicle lighting system to be illuminated. In like manner, the auxiliary lighting system may be further comprised of a third gate in communication with the vehicle transceiver, and connected to an electrical conductor supplying electrical power to the vehicle right directional light. When an electrical signal indicative of illumination of the vehicle right directional light is communicated through the third gate to the vehicle transceiver, and on to the helmet transceiver, and to the microcontroller, the microcontroller causes the right directional light of the vehicle lighting system to be illuminated.

In another aspect of the present disclosure, an alternative remote auxiliary lighting system for a helmet operable in conjunction with a vehicle lighting system is provided. The vehicle lighting system is comprised of a battery, a vehicle brake light, and a processor programmed with an algorithm to send a first encoded signal to cause illumination of the vehicle brake light. The auxiliary lighting system is comprised of a helmet portion and a vehicle portion. The helmet portion is comprised of a helmet electrical power supply, a helmet lighting unit connected to the power supply and comprising at least a helmet brake light, a microcontroller connected to the power supply and in signal communication with the helmet brake light, and a helmet transceiver in signal communication with the microcontroller. The vehicle portion is comprised of a vehicle transceiver in wireless signal communication with the helmet transceiver, and a first gate in signal communication with the vehicle transceiver and in signal communication with the processor of the vehicle lighting system, and operable to pass encoded signals to the vehicle transceiver, on to the helmet transceiver, and on to the microcontroller when the processor communicates one or more encoded signals to the first gate. The microcontroller is programmed with an algorithm such that when executed, when the first encoded signal is received by the microcontroller, the microcontroller causes the helmet brake light to be illuminated.

The vehicle lighting system may be further comprised of a vehicle left directional light and a vehicle right directional light, and the vehicle lighting processor may be programmed with an algorithm to send a second encoded signal to cause illumination of the vehicle left directional light, and a third encoded signal to cause illumination of the vehicle right directional light. In such circumstances, the helmet lighting system may be further comprised of a helmet left directional light, and a helmet right directional light, and the microcontroller may be programmed with an algorithm such that when executed, when the second encoded signal is received by the microcontroller, the microcontroller causes the helmet left directional light to be illuminated; and when the third encoded signal is received by the microcontroller, the microcontroller causes the helmet right directional light to be illuminated.

In certain embodiments, the auxiliary lighting system may be further comprised of an accelerometer in signal communication with the microcontroller, and operable to send a signal indicative of vehicle acceleration to the microcontroller; and a second gate in communication with the vehicle transceiver, and under a condition when the first encoded signal is received by the microcontroller, operable to electrically connect the battery to the vehicle brake light. The auxiliary lighting system may be further comprised of a third gate in signal communication with the vehicle transceiver and in signal communication with the processor of the vehicle lighting system, and operable to pass encoded signals to the processor. In such embodiments, the microcontroller may be programmed with an algorithm such that when executed, when the accelerometer communicates to the microcontroller that a threshold level of deceleration is exceeded, the microcontroller communicates the first encoded signal to the helmet transceiver, to the vehicle transceiver, to the third gate, and to the processor; and the microcontroller communicates a switching signal to the helmet transceiver, to the vehicle transceiver, and to the second gate to cause the vehicle brake light to be illuminated. In certain embodiments, the accelerometer may be included in the vehicle lighting system and may be in communication with the vehicle transceiver, and wherein signal indicative of vehicle acceleration from the accelerometer is communicable to the vehicle transceiver, to the helmet transceiver, and to the microcontroller.

The vehicle brake light of the vehicle lighting system may be comprised of a primary brake light and a supplemental brake light; In such circumstances, an alternative auxiliary lighting system may be further comprised of an accelerometer in signal communication with the microcontroller and operable to send a signal indicative of vehicle acceleration to the microcontroller, The microcontroller may be programmed with an algorithm such that when executed, when the threshold level of deceleration is exceeded, the microcontroller sends a signal to the helmet transceiver, and on to the vehicle transceiver, and on to the gate, to electrically connect the battery to the supplemental brake light, and cause the supplemental brake light to be illuminated. The accelerometer may be included in the vehicle portion of the auxiliary lighting system, or in the helmet portion of the lighting system.

In accordance with the present disclosure, methods of operating an auxiliary lighting system for a safety helmet operable in conjunction with a lighting system of a vehicle are provided. Such a method may comprise detecting an encoded signal from a vehicle lighting system processor indicative of illumination of a vehicle brake light; from a vehicle transceiver, communicating the encoded signal to a helmet transceiver, and to a microcontroller of the auxiliary lighting system; and executing an algorithm by the microcontroller to cause a helmet brake light to be illuminated.

An alternative method may comprise detecting a first signal from an accelerometer indicative of deceleration of the vehicle in excess of a threshold level of deceleration; and executing an algorithm by the microcontroller to communicate a second signal to a helmet transceiver, and to a vehicle transceiver, to cause a vehicle brake light to be illuminated. Such a method may further comprise executing an algorithm by the microcontroller to cause a helmet brake light to be illuminated.

BRIEF DESCRIPTION OF THE DRAWINGS

The present disclosure will be provided with reference to the following drawings, in which like numerals refer to like elements, and in which.

Figure 2:
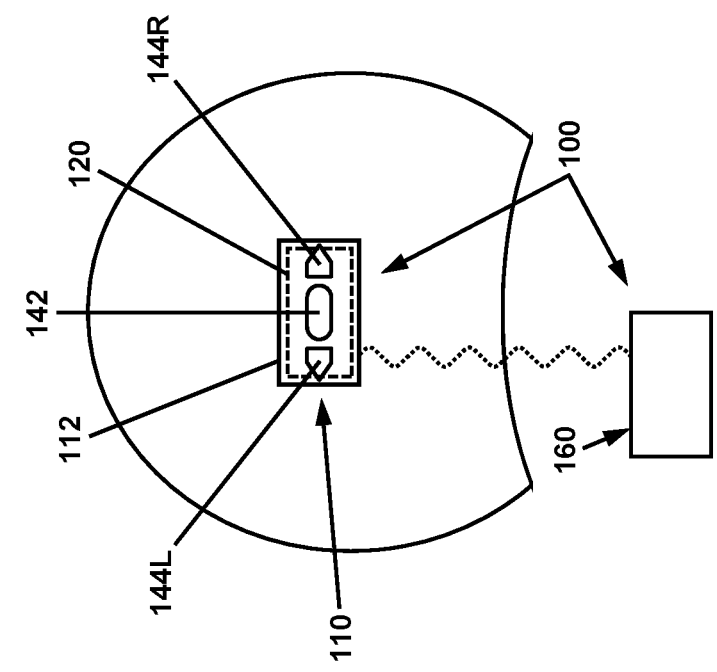
FIG. 2 is a schematic rear view of the safety helmet including the lighting system of FIG. 1.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

BEST MODE FOR CARRYING OUT THE INVENTION

For a general understanding of the present invention, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

In the following disclosure, the present invention is described in the context of its use as a remote lighting system, which can be embedded in or joined to a motorcycle helmet, and which includes lighting elements that are operable to correspond with respective lighting elements on the motorcycle. However, the remote lighting system is not to be construed as being limited only to use on a motorcycle helmet. The remote lighting system might be worn elsewhere on a rider, such as on a jacket of the rider beneath the neck area. Additionally, the remote lighting system and methods of use thereof are applicable to other vehicles, and in particular, "powersport" vehicles. As used herein, the term "powersport vehicle" includes, but is not limited to, motorcycles, scooters, all-terrain vehicles (ATVs), personal watercraft ("jet skis"), and snowmobiles.

Additionally, the remote lighting system is adaptable to any use in which remote lighting is desirable to be provided in a manner that corresponds to primary lighting on an object. With regard to vehicular applications, the remote lighting system is also adaptable to vehicle towing applications. A vehicle that is being towed, such as an inoperative automobile, or a trailer that lacks its own lighting, can have the remote lighting system of the present disclosure temporarily attached thereto, and rendered more visible for safer towing.

Additionally, the description provided herein may identify certain components with the adjectives "top," "upper," "bottom," "lower," "left," "right," etc. These adjectives are provided context of use of the remote lighting system on a safety helmet, and in the context of the orientation of the drawings, which is arbitrary. The description is not to be construed as limiting the remote lighting system to use in a particular spatial orientation. The instant system may be used in orientations other than those shown and described herein.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

As used herein, the term "deceleration" is meant to indicate negative acceleration. With regard to a vehicle, deceleration of the vehicle is a reduction in the speed of the vehicle. "Exceeding a threshold deceleration" means exceeding a level of negative acceleration. With regard to a vehicle, "exceeding a threshold deceleration" means exceeding a predetermined rate of reduction in speed of the vehicle. It is to be understood that deceleration, i.e., negative acceleration, is detectable by an accelerometer.

Figure 1:
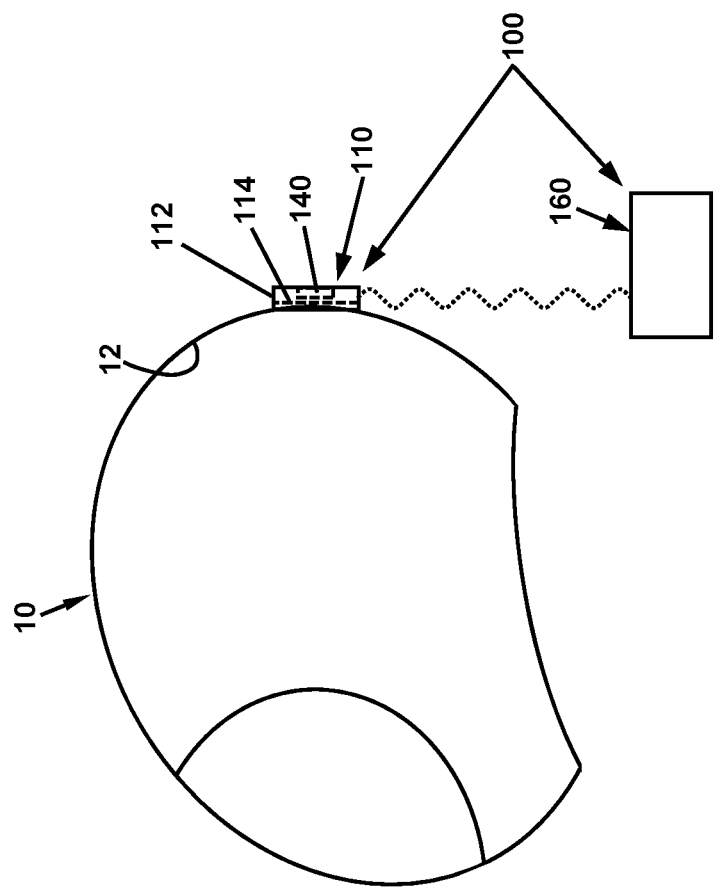
FIG. 1 is a side elevation view of an embodiment of the present disclosure, configured as an auxiliary safety lighting system mounted on or integrated into a safety helmet.

FIG. 1 is a side elevation view of an embodiment of the present disclosure, configured as an auxiliary safety lighting system mounted on or integrated into a safety helmet. FIG. 2 is a schematic rear view of the safety helmet including the lighting system of FIG. 1. Referring to FIGS. 1 and 2, the helmet 10 is comprised of a rigid impact-resistant hard outer shell 12. The shell 12 is typically lined with an impact absorbing resilient material (not shown), such as a foam, formed to match the general shape of a human skull.

The helmet portion 110 of the lighting system 100 is preferably mounted on the rearward region of the helmet 10. Mounting may be accomplished by the use of adhesive material, such as a liquid that cures into a solid, for example, silicone rubber. Alternatively, double sided adhesive tapes, such as VHB™ tape manufactured and sold by the 3M Company, may be used. Alternatively, adhesive backed hook and loop fastening materials or magnetic fastening means may be used. In alternative embodiments, instead of being mounted on or fabricated within a helmet 10, the helmet portion 110 of the system 100 may mounted on a jacket or other article of clothing, or it may be attached to the motorcycle at a location higher than the typical location of the motorcycle lighting.

Figure 3A:
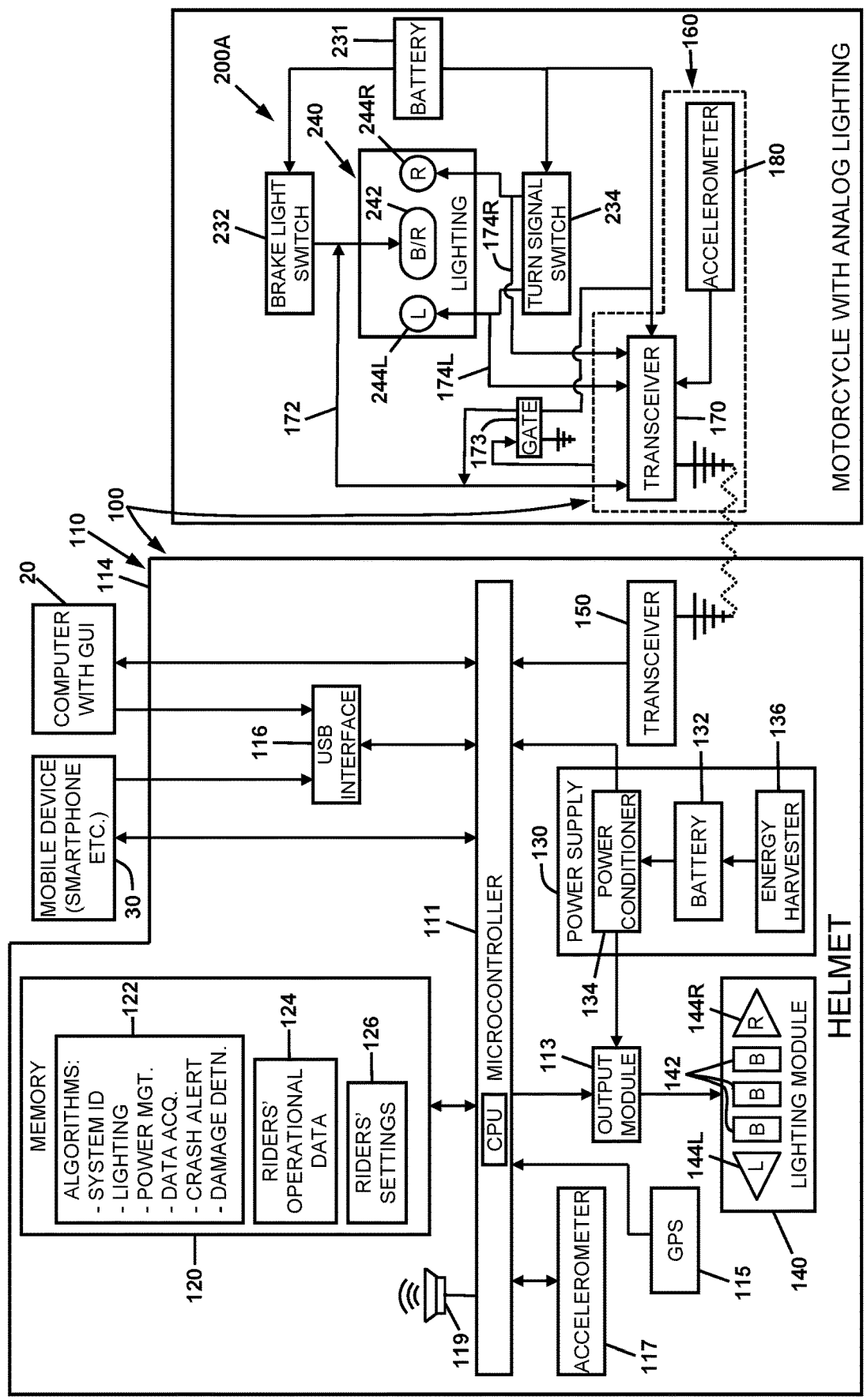
FIG. 3A is a block diagram of helmet safety lighting system of FIG. 1 configured for operation in conjunction with a motorcycle equipped with analog lighting.
Figure 3B:
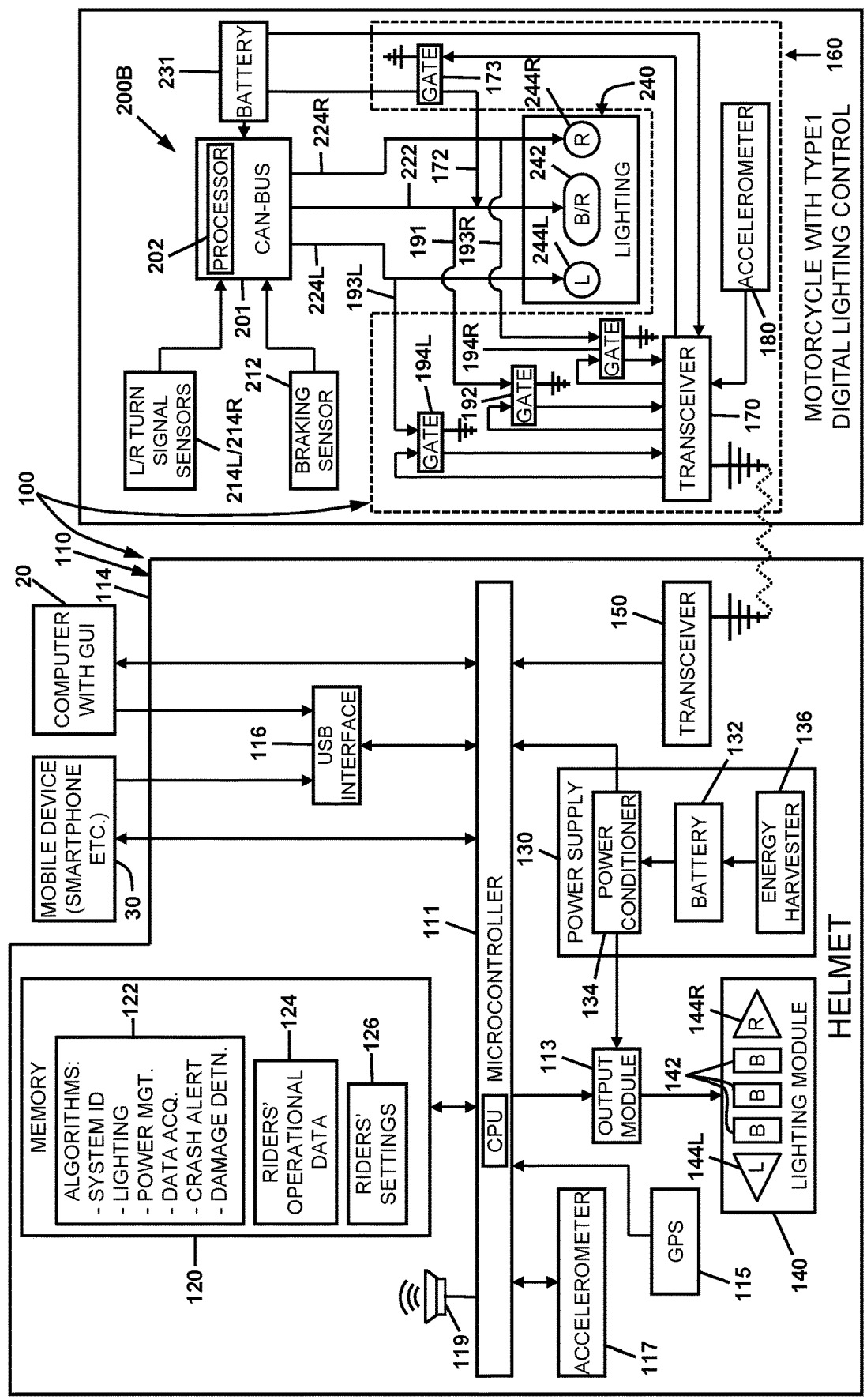
FIG. 3B is a block diagram of helmet safety lighting system of FIG. 1 configured for operation in conjunction with a motorcycle equipped with a first type of digitally operated lighting.
Figure 3C:
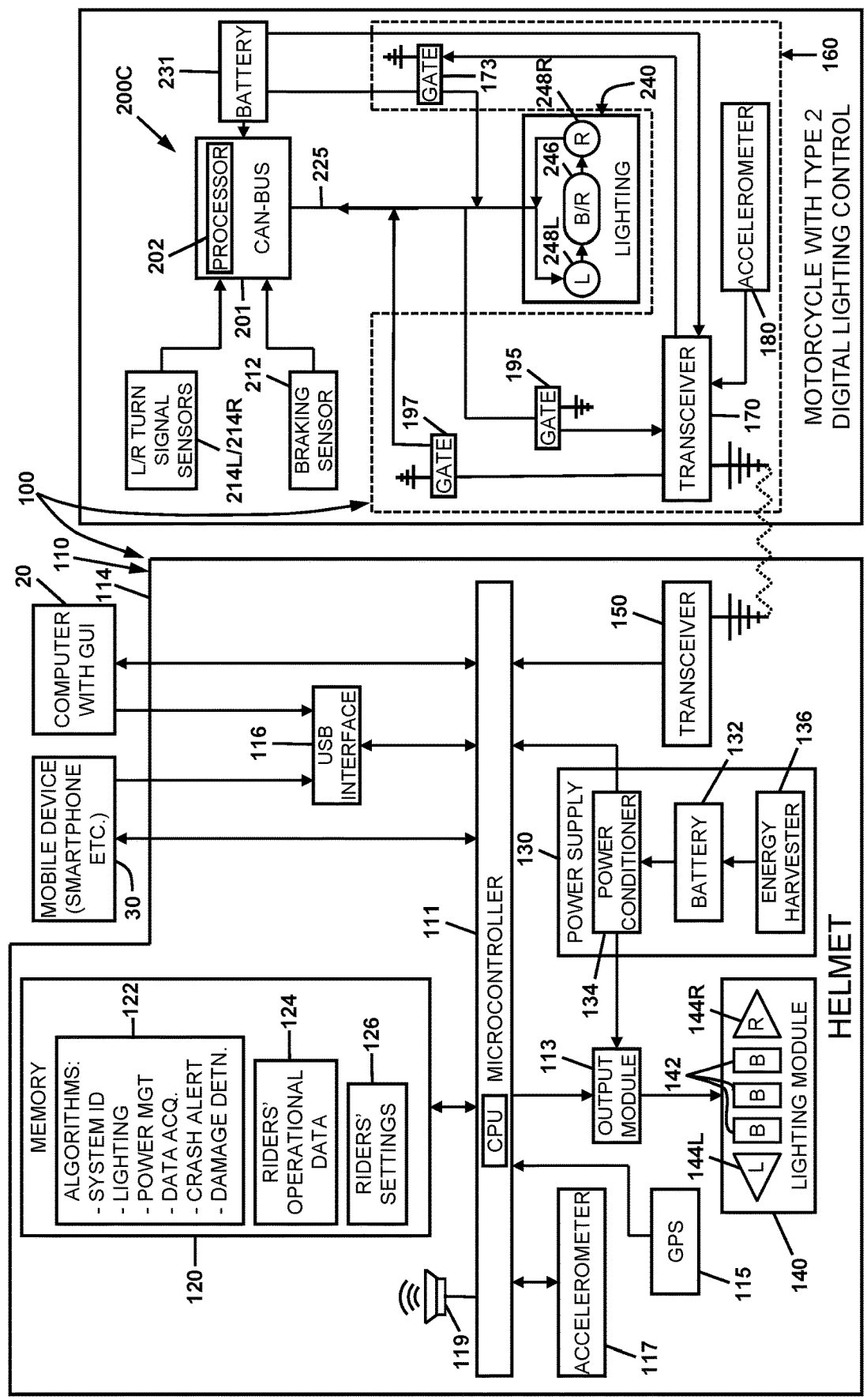
FIG. 3C is a block diagram of helmet safety lighting system of FIG. 1 configured for operation in conjunction with a motorcycle equipped with a second type of digitally operated lighting.

The helmet portion 110 of the lighting system 100 is contained within a housing 112. For the sake of simplicity of illustration, the housing 112 is depicted as being rectangular. However, the housing 112 may have other shapes based upon aesthetic preferences of customers and/or functional requirements such as matching the curved shape of the helmet shell 20 or corresponding to the shape of the lighting elements contained by the housing 112. The helmet portion 110 of the lighting system 100 is further comprised of a circuit board 114, upon which are mounted the various components of the helmet portion 110 as depicted in FIGS. 3A-3C, which will be described subsequently herein.

Additionally, the helmet portion 110 is further comprised of a lighting unit 140, which for auxiliary vehicle safety lighting applications, includes a center running and stop (or brake) light 142, a left directional light 144L, and a right directional light 144R. It is to be understood that the term "light," when used with reference to a left directional light, a right directional light, and/or a running/stop light on a vehicle, or in the lighting unit 140, is meant to include, but is not limited to, single incandescent light bulbs (and in the case of a running/stop light, a dual filament single incandescent light bulb), a cluster of incandescent bulbs, a single light emitting diode (LED), or clusters of light emitting diodes, or organic light emitting diodes (OLEDs). Such lighting elements are provided as needed in the lighting unit 140 to provide sufficient brightness so as to be easily seen by a human observer in darkness or daylight, and as needed to meet U.S. Department of Transportation and other applicable regulatory requirements.

Although the lighting element 140 is depicted in FIG. 1 as being separate from the circuit board 114, the lights 144L, 144R, and 142 may be mounted on and/or integrated into the circuit board 114. Additionally, in the embodiment of the system 100 depicted in FIGS. 1 and 2, the entire helmet portion 110 of the system 100 is depicted as being mounted on and entirely exterior to the shell 12 of the helmet 10. This configuration is amenable to situations in which the helmet is manufactured separately, and then the helmet portion 110 of the system 100 is mounted on the shell 12 of the helmet after helmet manufacturing. This would be common practice if the lighting system were sold as an "aftermarket" product. However, in alternative embodiments, the helmet portion 110 of the system 100 may be included in the helmet 10 during its manufacturing. In such an embodiment (not shown), the circuit board 114 may be embedded in helmet 10 inside of or embedded in the inner surface of the hard shell 12 thereof, with the lighting unit 140 mounted on or embedded in the exterior of the helmet shell 12. In such embodiments, the circuit board 114 may be a small thin rigid board, or a thin flexible substrate formed with a similar curvature to the shell 12 of the helmet 10.

The lighting system 100 is further comprised of a vehicle portion 160. The components of the vehicle portion 160 are mounted on and connected to certain electrical components of the vehicle (not shown), which may be a powersport vehicle, such as a motorcycle. The vehicle portion 160 of the system 100 is in signal communication with the helmet portion 110 of the system 100 for reasons and functions that will be described subsequently herein.

It is to be understood that the arrangement of the respective components shown in FIGS. 1 and 2 is for illustrative purposes only, and that many other suitable arrangements of such components may be provided, while giving satisfactory function and performance in the applicants' safety lighting system for use as auxiliary safety lighting on a helmet, and for other auxiliary safety lighting applications.

An embodiment of the auxiliary lighting system 100 for use as a system on a helmet, and coupled to the lighting of a motorcycle, will now be described with reference to FIGS. 3A-3E. In each of the embodiments depicted in FIGS. 3A-3E, the system 100 is comprised of a helmet portion 110 and a vehicle portion 160. The helmet portion 110 is mounted on or built into the helmet 10 as described previously. The vehicle portion 160 is connected to the electrical circuits 200A, 200B, or 200C of the motorcycle (or other powersport vehicle, automobile, truck, or other vehicle as the application requires). The manner of connection to the motorcycle depends upon whether the motorcycle has analog lighting (FIG. 3A), a first type of digital lighting (FIGS. 3B and 3D), or a second type of digital lighting (FIGS. 3C and 3E). In a preferred embodiment of the lighting system 100, the same lighting system may be provided as a "universal" system that may be provided to operate with any motorcycle and its lighting by configuring the electrical connections according to the type of motorcycle.

Referring to FIGS. 3A-3E, the helmet portion 110 of the system may be the same for all three types (analog, first type digital, second type digital) of motorcycle lighting. The helmet portion 110 is comprised of numerous electronic components, which may be mounted on a circuit board 114 and connected with fine conductive ribbons or pathways deposited on the board 114. The components of the helmet portion include a microprocessor or microcontroller 111, a memory 120, a power supply 130, and a lighting unit 140. The microcontroller 111 is in communication with the memory 120, which may contain various operational program instructions and algorithms 122 (to be described subsequently), individual motorcycle riders' system settings 124, and operational data 126 acquired during motorcycle rides.

An external communication interface, such as a USB interface 116 in communication with the microcontroller 111 may be provided so as to enable uploading of rider settings 126, software and firmware 122 into the memory 120, and downloading of riders' data 124 and other system diagnostic and/or operational data. The USB interface 116 is connectable to an external computer 20 with a graphical user interface (GUI), or a mobile device 30 such as a smartphone.

The lighting unit 140 includes a running and brake light 142, a left directional light 144L, and a right directional light 144R. The lights 142, 144L, and 144R may be comprised of respective clusters of bright light emitting diodes. The direction lights 144R and 144L are preferably amber in color, and the brake light is preferably red in color, in order to meet DOT regulations, as well as to conform to perceptions of observers as to the information communicated by the lights. The direction lights 144R and 144L may be formed to have arrow or laterally pointed shapes to further communicate direction.

The power supply 130 includes a battery 132, and a power conditioner circuit 134. The power conditioner 134 adjusts voltage to a desired level to be supplied to an output module 113, which, during operation of the system 100, receives signals from the microcontroller 111 to cause the brake light 142, left directional light 144L, and right directional light 144R to be turned on and off. In certain embodiments, the power conditioner 134 maintains the voltage to the lights at a nominal value of 12 volts DC. In certain embodiments, the center light 142 is operated as a running and brake light, with a moderate brightness level as a running light, and a high brightness level as a brake light. To accomplish this, the microcontroller 111 may be programmed to provide intermittent bursts of voltage, such as a square wave fluctuating at zero volts off and 12 volts DC on, and at a high enough frequency so that an observer does not perceive the light to be flickering, but instead as of a steady moderate brightness. LEDs are especially suitable to operate in this manner.

The power conditioner also provides a second voltage level for providing power to the microcontroller and other electronic components in communication therewith. Typically, such voltage is regulated to a nominal value of 5 volts DC.

In certain embodiments, the power supply 130 may include an energy harvesting device 136 for recharging the battery 132 and/or providing operating power to the power conditioner 134. The energy harvesting device 136 may include a solar cell (not shown), and/or a vibration energy harvesting device (not shown), such as a piezoelectric cell.

In certain embodiments, the helmet portion 110 of the system 100 may include a Global Positioning System (GPS) tracker 115 in communication with the microcontroller 111. The GPS tracker 115 may be particularly useful in the event of a crash, when emergency assistance needs to be summoned.

In certain embodiments, the helmet portion 110 may include a helmet accelerometer 117 in communication with the microcontroller 111. The helmet accelerometer 117 may be used to detect damage to the helmet 10 and/or an impact above a threshold level at which injury to the helmet wearer may have occurred, as will be described subsequently in greater detail.

The helmet portion 110 of the system 100 is further comprised of a helmet transceiver 150, which is in communication with the microcontroller 111, and in communication with a vehicle transceiver 170 of the vehicle portion 160 of the system 100. The details of signal communication between the helmet transceiver 150 and vehicle transceiver 170 will be subsequently described in detail for each type of motorcycle lighting.

It is to be understood that the helmet portion 110 of the system is illustrated schematically, and that the specific architecture of the circuits may vary. The helmet portion 110 may be provided with a separate microcontroller 111 that may include a central processing unit (CPU). Alternatively, some or all of the electronic components, including the microcontroller 111, memory 120, accelerometer 117, output module 113, power conditioner 134, GPS tracker 115, and transceiver 150 may be integrated into a single electronic chip, such as an application specific integrated circuit (ASIC).

Having described the various components and overall configuration of the helmet portion 110 of the system 100, the components and configuration of the vehicle portion 160 will now be described, including its interface with motorcycles with analog lighting, with a first type of digitally operated lighting, or with a second type of digitally operated lighting. Turning first to FIG. 3A, which depicts the system 100 in operation with a motorcycle having analog lighting, the electrical lighting circuit 200A of the motorcycle is comprised of a lighting unit 240, a battery 231, at least one brake light switch 232, and a turn signal switch 234. In operation of the motorcycle, when the at least one brake light switch 232 is actuated by applying either the front brake (typically by a hand gripped lever), or the rear brake (typically by a foot operated lever), the brake light switch 232 is closed, and the brake light 242 is illuminated. The brake light 242 may be an incandescent bulb, an LED, or a cluster of LEDs, an OLED or sheet of OLEDs, or another suitable lighting element.

Additionally, in motorcycle operation, when the turn signal switch 234 is actuated to indicate a left turn, power is delivered to the left light 244L, thereby illuminating it. In like manner, when the turn signal switch 234 is actuated to indicate a right turn, power is delivered to the right light 244R, thereby illuminating it. If a flasher switch (not shown) is actuated, both the left and right directional lights 244L and 244R are illuminated. The respective left and right directional lights 244L and 244R may be incandescent bulbs, LEDs, or clusters of LEDs, OLEDs, or other suitable lighting elements.

In the embodiment of the auxiliary safety lighting system 100 depicted in FIG. 3A, the vehicle portion 160 of the system 100 is comprised of a vehicle transceiver 170, and a vehicle accelerometer 180. The vehicle portion 160 may also include additional components for use with motorcycles with digital lighting (to be described subsequently) in order to render the system 100 as "universal" to the majority of motorcycles in operation, but in connecting the vehicle portion 160 to a motorcycle with analog lighting circuit 200A, such components are not used.

In implementing the auxiliary safety lighting system 100 to operate with a motorcycle with analog lighting, an electrical connection 172 is provided between the vehicle transceiver 170 and the electrical wire or pathway between the brake light switch 232 and the brake light 242, or to the output terminal (not shown) of the brake light switch 232. Additionally, an electrical connection 174L is provided between the vehicle transceiver 170 and the electrical wire or pathway between the turn signal switch 234 and the left turn signal light 244L, or to the left output terminal (not shown) of the turn signal light switch 234. In like manner, an electrical connection 174R is provided between the vehicle transceiver 170 and the electrical wire or pathway between the turn signal switch 234 and the right turn signal light 244R, or to the right output terminal (not shown) of the turn signal light switch 234.

In operation of the lighting system 100 with a motorcycle with analog lighting, when the rider applies the motorcycle brake(s), and thus closes brake light switch 232, the vehicle transceiver 170 receives electrical power via connection 172, indicating that the motorcycle brake has been applied. The vehicle transceiver 170 communicates a wireless signal to the helmet transceiver 150 of the helmet portion 110 of the system 100, which in turn is communicated to the microcontroller 111. The microcontroller 111 executes an algorithm by which the brake light 142 of the lighting unit 140 on the helmet 10 is illuminated. In like manner, when the rider actuates the left or right turn signal switch 234, the vehicle transceiver 170 receives a corresponding signal via connection 174L or 174R, which is communicated accordingly to the helmet transceiver 150, and to the microcontroller 111. The microcontroller 111 executes an algorithm by which the left or right directional light 144L or 144R on the helmet 10 is illuminated in concert with the respective motorcycle left or right directional light 244L or 244R.

In certain embodiments, the wireless communication between the helmet transceiver 150 and the vehicle transceiver 170 may be by H-field backscatter communication as disclosed in the aforementioned commonly owned U.S. Pat. No. 7,218,214 of Werner et al. In certain embodiments, the wireless communication between the helmet transceiver 150 and the vehicle transceiver 170 may be by Bluetooth® communication. The communication may be according to the Bluetooth 5 standard, which includes low energy Bluetooth® (BLE) communication. Other forms of wireless communication are contemplated, including further versions of Bluetooth® that become available as they are developed.

It can be seen that under the above procedure, the only time that the brake light 142 on the helmet is applied is when the brake light switch 232 on the motorcycle is actuated. The Applicant has realized that this is a problem in some instances, because a motorcycle can decelerate at a high rate even if the mechanical brakes are not applied. In particular, when the motorcycle is operated in traffic in a low gear (e.g., first or second gear), if the rider simply and abruptly releases the throttle, the motorcycle will decelerate rapidly without application of the mechanical brake, and therefore, without illumination of the brake light 242. This is a dangerous situation, because a following motorist will likely not perceive how quickly the motorcycle is decelerating just based on visual depth perception, particularly at night. Accordingly, the risk of a rear end collision is significantly increased under these circumstances, which are quite common.

To solve this problem, the instant lighting system 100 is configured to communicate with the motorcycle lighting circuit 200A, and in particular, with the brake light 242, to operate the brake light 242 in the event of a high rate of deceleration not caused by application of the motorcycle brake. In a preferred embodiment, the vehicle portion 160 of the lighting system 100 is provided with a vehicle accelerometer 180 in communication with the vehicle transceiver 170. Thus the vehicle accelerometer 180 detects acceleration of the motorcycle, including negative acceleration (deceleration), and lateral acceleration, i.e. left or right directional change of the motorcycle. This acceleration data is communicated to the vehicle transceiver 170, and wirelessly to the helmet transceiver 150, and on to the microcontroller 111. The microcontroller 111 is programmed with an algorithm, by which the acceleration of the motorcycle is monitored. If a threshold level of deceleration is exceeded, such as a level comparable to that when the mechanical brake is applied, then the microcontroller 111 communicates a signal via helmet transceiver 150 to vehicle transceiver 170, to energize a gate 173. The gate 173 is an "electronic relay" which functions as a normally open switch. When gate 173 is energized, the switch is closed, thus allowing power from battery 231 to pass through gate 173, and on through conductor 172 to brake light 242. In that manner, when the motorcycle undergoes deceleration that exceeds a predetermined threshold, even without the application of the mechanical motorcycle brake, the motorcycle brake light 242 is caused to illuminate. This feature greatly enhances rider safety, by reducing the risk of a rear end collision.

In an alternative embodiment, the helmet accelerometer 117 that is included in the helmet portion 110 of the system 100 may be used as the detector of a threshold level of motorcycle deceleration. However, the helmet accelerometer 117 is subjected to more "noise," such as from various motions of the wearer's head, which must be filtered out. The vehicle accelerometer 180 provides a better representation of the actual acceleration and deceleration of the motorcycle, and thus in a preferred embodiment, the helmet accelerometer 117 is primarily used to detect helmet deceleration, and in an extreme case, resulting helmet damage, and a possible crash involving an impact by the wearer with an object of the ground.

At a point in research and development of the Applicant's auxiliary lighting system, the Applicant fabricated an auxiliary lighting system similar to that disclosed in the aforementioned U.S. Pat. No. 7,218,214 of Werner et al. The helmet portion of the system was installed in a safety helmet, and the vehicle portion of the system was installed in a relatively new motorcycle, a 2014 BMW R1200 GS motorcycle, with the expectation that the auxiliary lighting system and motorcycle lighting would function properly.

That did not occur. When attempting to use the experimental auxiliary lighting system, the instrument panel of the motorcycle indicated electrical faults in the motorcycle lighting. Such faults would obviously be of concern to a motorcycle owner/rider, and additionally, to clear the faults and reset the electrical system, a trip to an authorized dealer or repair shop would be required, at considerable expense to the motorcycle owner. Upon investigation of the problem, it was found that the electrical system of the test motorcycle used a type of CAN-Bus system for control of lighting and other components on the motorcycle.

Upon further investigation, it was found that by connecting the vehicle portion of the auxiliary lighting system directly into the motorcycle brake and directional lighting circuits (in a manner similar to that shown in FIG. 3A), the current draw of the connections into the vehicle transceiver of the vehicle portion of the system was sufficiently high to cause fault alarms to be issued by the processor of the CAN-Bus system. Basically, a CAN-Bus system is programmed to "expect" a certain current draw by the motorcycle directional lights, brake lights, and other components. Any variation in current draw outside of predetermined limits is suggestive of a broken wiring connection, a "burned out" lamp, a short circuit, or another defect. By connecting the vehicle portion of the auxiliary lighting system directly into the motorcycle brake and directional lighting circuits, it appeared that the CAN-Bus processor was interpreting the additional current draw to be indicative of a short circuit or other fault. Accordingly, a fault code was displayed on the motorcycle instrument panel.

This situation was obviously unacceptable. The problem that was presented was, how to interface the vehicle portion of the lighting system with the motorcycle lighting in a manner that did not cause the CAN-Bus system to issue fault codes. In other words, the vehicle portion of the lighting system needed to be "invisible" to the CAN-Bus system of the motorcycle, while still being able to detect the operation of the motorcycle brake light and directional lights.

Additionally, it was found that there are at least two configurations of CAN-Bus electrical system. A first system 200B is depicted in FIG. 3B, and is referred to as "Type 1 Digital Lighting Control," the term "digital" used because the CAN-Bus system includes a digital processor as opposed to the analog lighting 200A of the system of FIG. 3A. A second system 200C is depicted in FIG. 3C, and is referred to as "Type 2 Digital Lighting Control." For the motorcycle lighting components, both systems 200B and 200C have in common a CAN-Bus 201 including a processor 202, a brake application sensor 212, and left and right turn signal sensors 214L and 214R. These sensors have relatively low current draw, and are actuated respectively when the mechanical brake and signal light controls on the motorcycle are operated.

Referring now to FIG. 3B, in a "Type 1" digital lighting control system, the CAN-Bus 201 delivers electrical power to the brake light 242 via wire 222, to the left directional light 244L via wire 224L, and to the right directional light 244R via wire 224R. In addition to supplying the electrical power, the processor of the CAN-Bus monitors the respective current draws for each circuit, and if the current draw is outside of a predetermined range, an alarm is displayed on the motorcycle instrument panel. Again therefore, a direct connection from any one of these wires into the vehicle transceiver 170 cannot be made, because it will result in a fault alarm.

To solve this problem for Type 1 digital lighting control, the vehicle portion 160 of the lighting system 100 is further comprised of respective gates 192, 194L, and 194R. Each of these gates is an "electronic relay" which functions as a normally open switch. When a gate is energized, the switch is closed, thus allowing power from the vehicle transceiver 170 to pass through the gate and back to the transceiver 170. However, the gates, being electronic switches, operate on exceedingly low current—on the order of microamperes. Such a current draw is low enough to not cause a fault alarm to be issued by the CAN-Bus system 201. Additionally, the vehicle transceiver 170 is powered by a direct connection to the motorcycle battery 231, so its current draw is not detected by the CAN-Bus, and has no adverse effect on it.

Thus, by way of illustration, when the CAN-Bus 201 detects that motorcycle braking has been applied via braking sensor 212, it supplies power via wire 222 to illuminate the brake light 242. Concurrently, the gate 192 is energized via wiring connection 191, but the current draw of gate 192 is sufficiently low so as to not result in the CAN-Bus issuing a fault alarm. Thus when motorcycle braking is applied, and the switch of gate 192 is closed, current flows from transceiver 170 out through gate 192 and back to vehicle transceiver 170. The vehicle transceiver 170 communicates this condition as a wireless signal to the helmet transceiver 150 of the helmet portion 110 of the system 100, which in turn is communicated to the microcontroller 111. The microcontroller 111 executes an algorithm by which the brake light 142 of the lighting unit 140 on the helmet 10 is illuminated, with no adverse effect on the CAN-Bus system 200B of the motorcycle.

In like manner, when the rider actuates the left or right turn signal switch, the left or right turn signal sensor 214L or 214R sends a signal to the CAN-Bus, which illuminates the left or right directional light 244L or 244R via respective wire 224L or 224R. The respective gate 194L or 194R is energized, closing the switch of the gate. The vehicle transceiver 170 receives a corresponding signal indicating this condition, which is communicated accordingly to the helmet transceiver 150, and to the microcontroller 111. The microcontroller 111 executes an algorithm by which the left or right directional light 144L or 144R is illuminated in concert with the respective motorcycle left or right directional light 244L or 244R with no adverse effect on the CAN-Bus system 200B of the motorcycle.

The previously described problem of lack of brake lighting illumination with deceleration of the motorcycle not caused by motorcycle braking is also solved by the system 100 of FIG. 3B. As in the system depicted in FIG. 3A, the vehicle portion 160 of the lighting system 100 is provided with a vehicle accelerometer 180 in communication with the vehicle transceiver 170. The acceleration data from the vehicle accelerometer is communicated to the vehicle transceiver 170, and wirelessly to the helmet transceiver, and on to the microcontroller 111. The microcontroller 111 is programmed with an algorithm, by which the acceleration of the motorcycle is monitored. If a threshold level of deceleration is exceeded, then the microcontroller 111 communicates a signal via helmet transceiver 150 to vehicle transceiver 170, to energize the gate 173. When gate 173 is energized, the switch is closed, thus allowing power from battery 231 to pass through gate 173, and on through conductors 172 and 222 to brake light 242. In that manner, when the motorcycle undergoes deceleration that exceeds a predetermined threshold, even without the application of the mechanical motorcycle brake, the motorcycle brake light 242 is caused to illuminate.

Figure 3D:
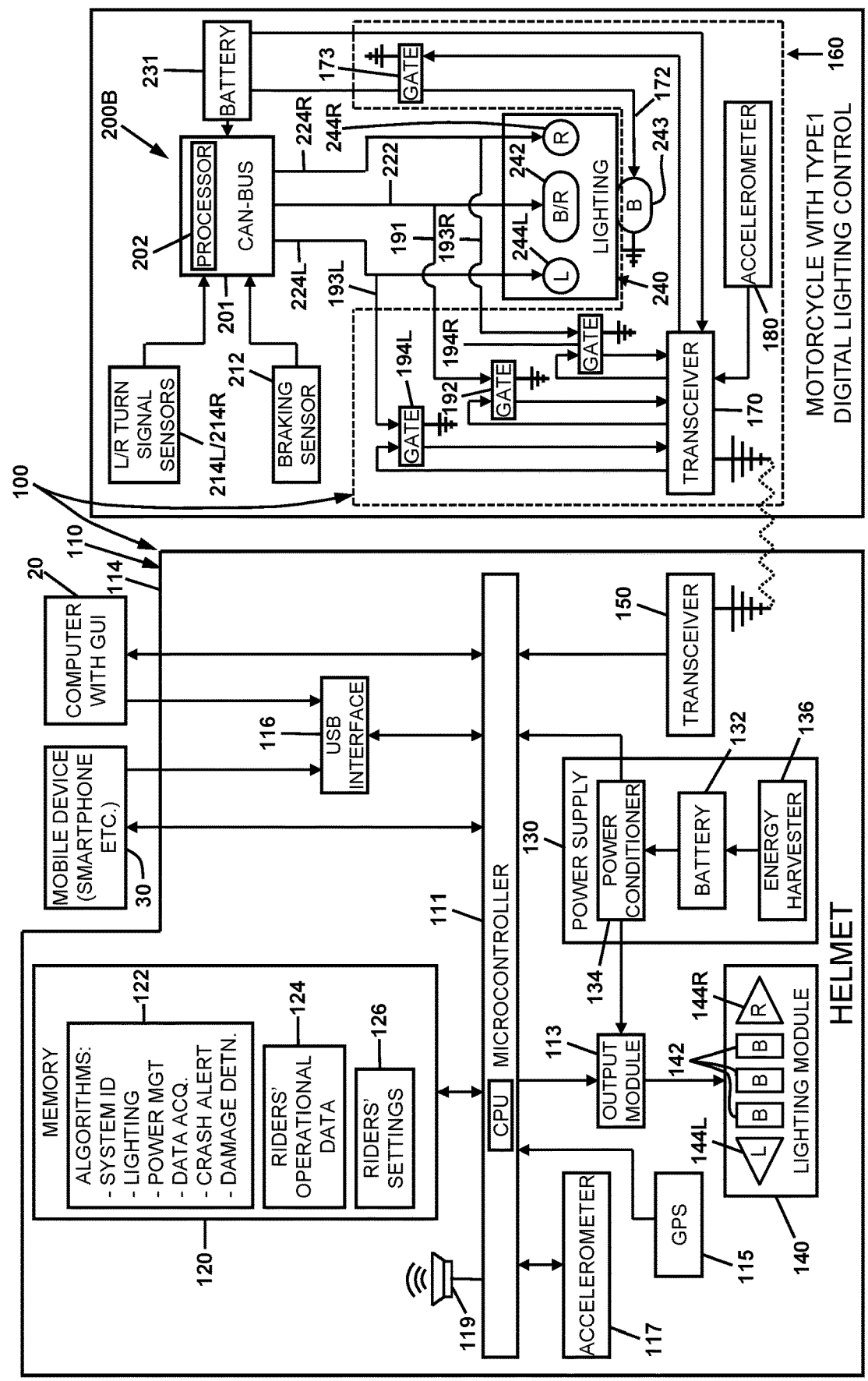
FIG. 3D is a block diagram of helmet safety lighting system of FIG. 1 configured for operation in conjunction with a motorcycle equipped with the first type of digitally operated lighting, and as an alternative to the system of FIG. 3B.
Figure 3E:
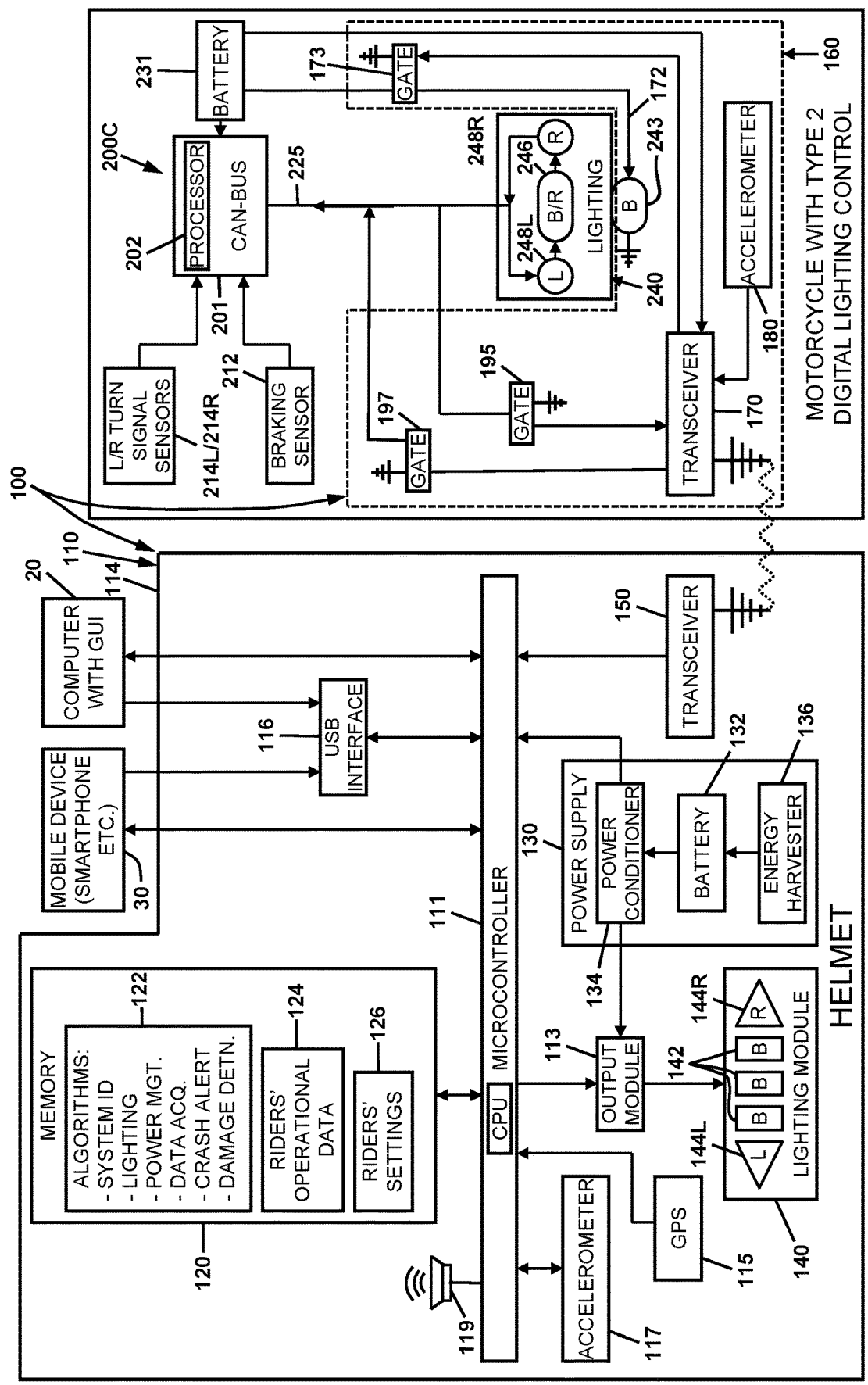
FIG. 3E is a block diagram of helmet safety lighting system of FIG. 1 configured for operation in conjunction with a motorcycle equipped with the second type of digitally operated lighting, and as an alternative to the system of FIG. 3C.

FIG. 3D is a block diagram of helmet safety lighting system of FIG. 1 configured for operation in conjunction with a motorcycle equipped with the first type of digitally operated lighting, and as an alternative to the system of FIG. 3B. The system 100 of FIG. 3D is provided with a supplemental brake light 243, which may be mounted on or in close proximity to the lighting unit 240 of the motorcycle. Instead of being connected to conductor 222 of the motorcycle wiring, conductor 173 is connected to the supplemental brake light 243. Thus when gate 173 is energized by the microcontroller due to deceleration as described above, power from battery 231 passes through gate 173, and on through conductor 172 to supplemental brake light 243. In that manner, when the motorcycle undergoes deceleration that exceeds the predetermined threshold, even without the application of the mechanical motorcycle brake, the supplemental brake light 243 is caused to illuminate.

Referring now to FIG. 3C, in a "Type 2" digital lighting control system, the CAN-Bus 201 delivers electrical power to the left directional light 248L, to the brake light 246, and to the right directional light 248R via wire 225. In addition to delivering electrical power to the lights, the CAN-Bus 201 also delivers encoded signals that are readable by the lights. Each of the lights 246, 248L, and 248R are "intelligent"

lights, and include signal receiving and detection capability, which is used to actuate the respective lights if the matching encoded signal is present. For example, if the brake light 246 is actuated by a signal code for the number 100, and if the brake light 246 detects the signal of the number 100 communicated via wire 225, then it will allow power to pass to the lighting elements of brake light 246 (typically LEDs), and the light 246 will illuminate. The CAN-Bus 201 also monitors the current draw, and is programmed to expect a certain amount of current to be drawn by brake light 246 when it is providing power with the signal of the number 100. If a current draw within a predetermined range does not occur, the CAN-Bus issues an alarm. The left directional light 248L and right directional light 248R are operated in a similar manner, with unique signal codes associated with their respective operation.

To render the lighting 140 of the helmet to be operable in conjunction with the lighting of the motorcycle with Type 2 digital lighting, in the event that the manufacturer of the motorcycle will not disclose its lighting signal codes, a "CAN-Bus reader" instrument may be obtained, which can be connected in the CAN-Bus of the motorcycle, and used to detect and read the signal codes for the lights 246, 248L, and 248R. Otherwise, the lighting signal codes may be obtained from the particular motorcycle manufacturer. Armed with this information, the lighting system 100 may be made capable of operating the helmet lighting 140 in concert with the motorcycle lighting 240.

Referring again to FIG. 3C, the vehicle portion 160 of the lighting system 100 is provided with a gate 195 for receiving the lighting signal codes via connection to wire 225 and to the CAN-Bus 201. When any one, two, or all three of the lights 246, 248L, and/or 248R are to be illuminated, the CAN-Bus 201 provides electrical power and the desired light operating signal(s) on wire 225. The gate 195 thus also receives electrical power from the CAN-Bus that is sufficient to close the switch of the gate 195, and allow current to pass therethrough. However, the gate 195 is wired to pass electrical power from the CAN-Bus to the vehicle transceiver 170, and to a receiving terminal of sufficient resistance so as to not draw enough current to cause the CAN-Bus to issue a fault alarm. Alternatively, a resistor (not shown) may be provided between the gate 195 and the transceiver 170, in order to prevent sufficient current draw to cause the CAN-Bus to issue a fault alarm In either case, the electrical power delivered to the transceiver through gate 195 is sufficient to enable detection of the encoded signals, and for such signals to be communicated wirelessly to the helmet transceiver 150 of the helmet portion 110 of the system 100, which in turn are communicated to the microcontroller 111. The microcontroller 111 executes an algorithm by which the respective brake light 142 and/or signal lights 144L and 144R are illuminated according to the detected signal codes, with no adverse effect on the CAN-Bus system 200C of the motorcycle.

The previously described problem of lack of brake lighting illumination with deceleration of the motorcycle not caused by motorcycle braking is also solved by the system 100 of FIG. 3C. As in the system depicted in FIG. 3A, the vehicle portion 160 of the lighting system 100 is provided with a vehicle accelerometer 180 in communication with the vehicle transceiver 170. The acceleration data from the vehicle accelerometer is communicated to the vehicle transceiver 170, and wirelessly to the helmet transceiver, and on to the microcontroller 111. The microcontroller 111 is programmed with an algorithm, by which the acceleration of the motorcycle is monitored. If a threshold level of deceleration is exceeded, then the microcontroller 111 communicates a signal via helmet transceiver 150 to vehicle transceiver 170, to energize the gate 173. When gate 173 is energized, the switch is closed, thus allowing power from battery 231 to pass through gate 173, and on through conductors 172 and 225 to brake light 246. However, an additional gate 197 is provided in the vehicle portion 160 of the system 100. This gate 197 is operable to feed a signal back into the CAN-Bus system via connection to wire 225. Thus in addition to operating gate 173 directly from the battery 231, the microcontroller 111 sends the required signal code to operate the brake light 246 from helmet transceiver 150 to vehicle transceiver 17. The delivery of a voltage from the vehicle transceiver 170 is sufficient to close the switch of gate 197, and allow current to flow, including the required signal code to operate the brake light 246, through wire 225 and on to the brake light 246, so that it illuminates based on the communication from the microcontroller 111. In the event that the CAN-Bus detects the additional current flow on wire 225 due to the illumination of the brake light 246, it also detects the required signal for lighting of the brake light 246, and this does not issue a fault alarm. In that manner, when the motorcycle undergoes deceleration that exceeds a predetermined threshold, even without the application of the mechanical motorcycle brake, the motorcycle brake light 246 is caused to illuminate with no adverse effect on the CAN-Bus system 200C of the motorcycle.

FIG. 3E is a block diagram of helmet safety lighting system of FIG. 1 configured for operation in conjunction with a motorcycle equipped with the first type of digitally operated lighting, and as an alternative to the system of FIG. 3C. As in the system 100 of FIG. 3D, the system 100 of FIG. 3E is provided with a supplemental brake light 243, which may be mounted on or in close proximity to the lighting unit 240 of the motorcycle. Instead of being connected to conductor 225 of the motorcycle wiring, conductor 173 is connected to the supplemental brake light 243. Thus when gate 173 is energized by the microcontroller due to deceleration as described above, power from battery 231 passes through gate 173, and on through conductor 172 to supplemental brake light 243. In that manner, when the motorcycle undergoes deceleration that exceeds the predetermined threshold, even without the application of the mechanical motorcycle brake, the supplemental brake light 243 is caused to illuminate.

Figure 4:
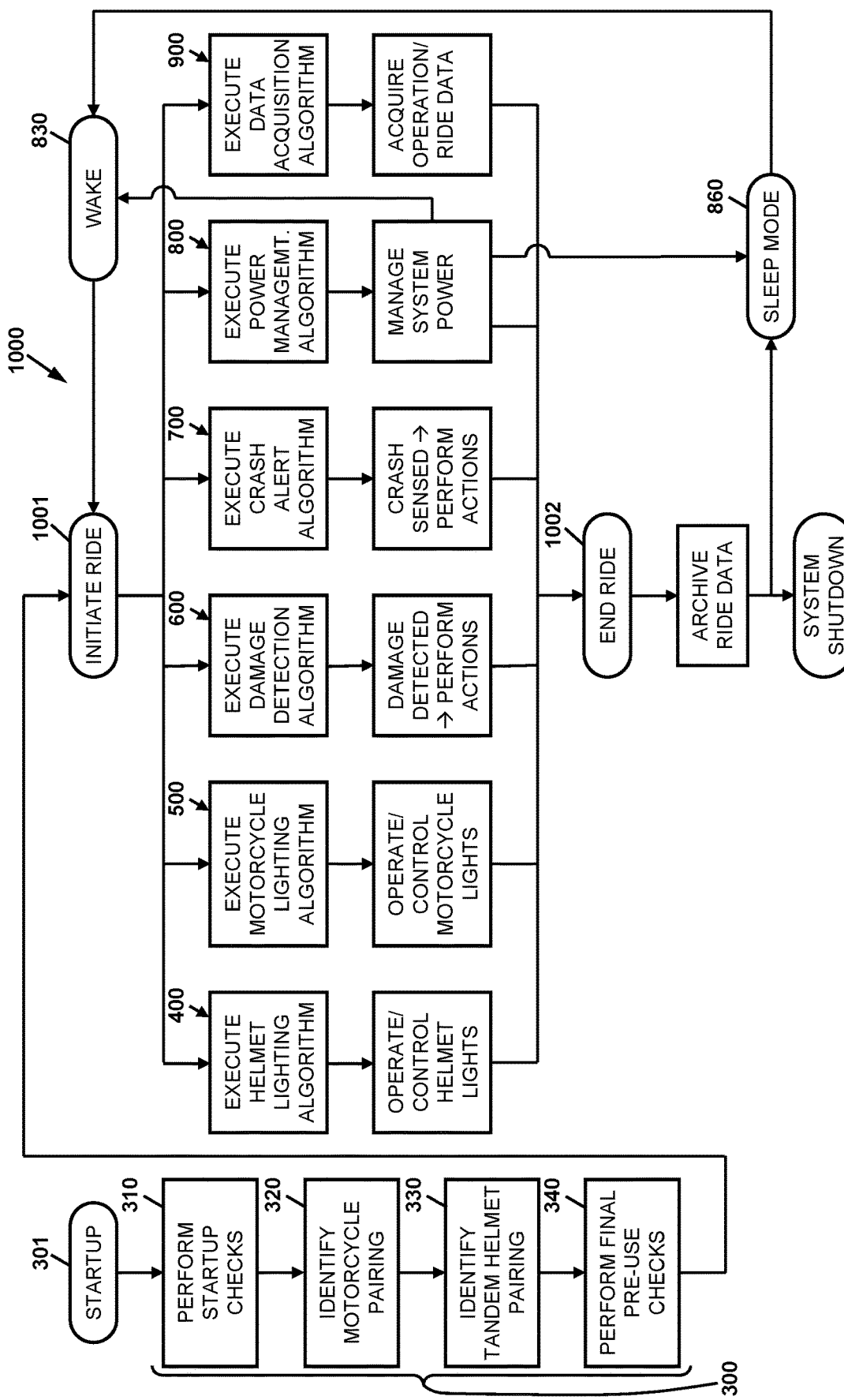
FIG. 4 is a master flowchart depicting the various control algorithms that are executed by the safety lighting system, and the overall operation of the system.

Turning to FIG. 4, a flowchart is provided, which depicts the various control algorithms and operational methods that are executed by the safety lighting system 100. The overall control scheme 1000 is comprised of a startup algorithm, helmet lighting methods and algorithm 400, motorcycle lighting method and algorithm 500, helmet damage detection method and algorithm 600, motorcycle crash method and algorithm 700, helmet power management method and algorithm 800, and data acquisition algorithm 900.

Upon startup 301 of the helmet portion 110 of the system 100, such as a first time startup, or a startup after battery replacement, the microcontroller 111 may execute an algorithm 300 to perform certain startup checks 310, such as checking the battery charge and projected battery life, function of the lights 142, 144L, and 144R, function of the accelerometer 117, and function of the transceivers 150 and 170. The check may include a determination from helmet accelerometer data as to whether the helmet has undergone any damage from previous use or from having been dropped onto a hard surface. The microcontroller 111 may also accept input settings from a rider, which may be input via a smartphone or other mobile device 30 through a USB interface 116, or wirelessly via a Bluetooth connection or other wireless communication protocol. The input settings may include identification 320 of the motorcycle or other powersport vehicle with which the system 100 is to operate, identification 330 of a tandem helmet pairing if a second rider will be on the motorcycle, and will be wearing a helmet 10 equipped with a helmet portion 110 of the system 100. In that case, the driver's helmet and the passenger's helmet will be programmed to communicate to establish the passenger's helmet as the "controlling" helmet, since it is the rearward most helmet, with its lighting being the most visible to following vehicles. The microcontroller 111 of the driver's helmet may be programmed to not operate when a passenger is present with the controlling helmet, since such lighting would be directed into the eyes of the passenger. The algorithm 300 may perform a final pre-use check 340, which may include sending a signal from helmet transceiver 150 to vehicle transceiver 170, and receiving a signal back, to verify that communication between the helmet portion 110 and the vehicle portion 160 of the system 100 has been established and is operable, and that operation of the motorcycle will result in communication with the helmet portion 110 of the system, and operation of lighting 140 on the helmet portion 110, as well as operation of the brake light 242 of the motorcycle when exceeding threshold deceleration as described previously. Referring to FIGS. 3A-3C, the helmet portion 110 of the system 100 may include an alarm device, such as a miniature speaker 119 that can be operated by the microcontroller 111 to "chirp," or issue a series of chirps, which may communicate that the system 100 is performing properly. Additionally, the chirps may be used to indicate alarm conditions, such as possible helmet damage. Alternatively or additionally, the alarm device may include a tactile alarm device, such as a vibratory element (not shown).

The rider (and optionally the passenger) wearing the helmet 10 then mounts the motorcycle and initiates 1001 the ride. The microcontroller 111 of the system executes in parallel methods and algorithms for operation 400 of the helmet lights 140, operation 500 of the motorcycle brake light, detection 600 of damage to the helmet 10, detection 700 of a crash, management 800 of the system power supply, and acquisition 900 of ride data. These various methods and algorithms will now be described in further detail. In these descriptions, when a reference is made to the microcontroller 111 detecting something that has occurred on or by the motorcycle (often by an action taken by the rider), it is to be understood that such occurrence has been detected by the vehicle transceiver 170 having received a signal indicative of such occurrence, and communicating to helmet transceiver 150 of such occurrence, which in turn is communicated to the microcontroller 111.

Figure 5A:
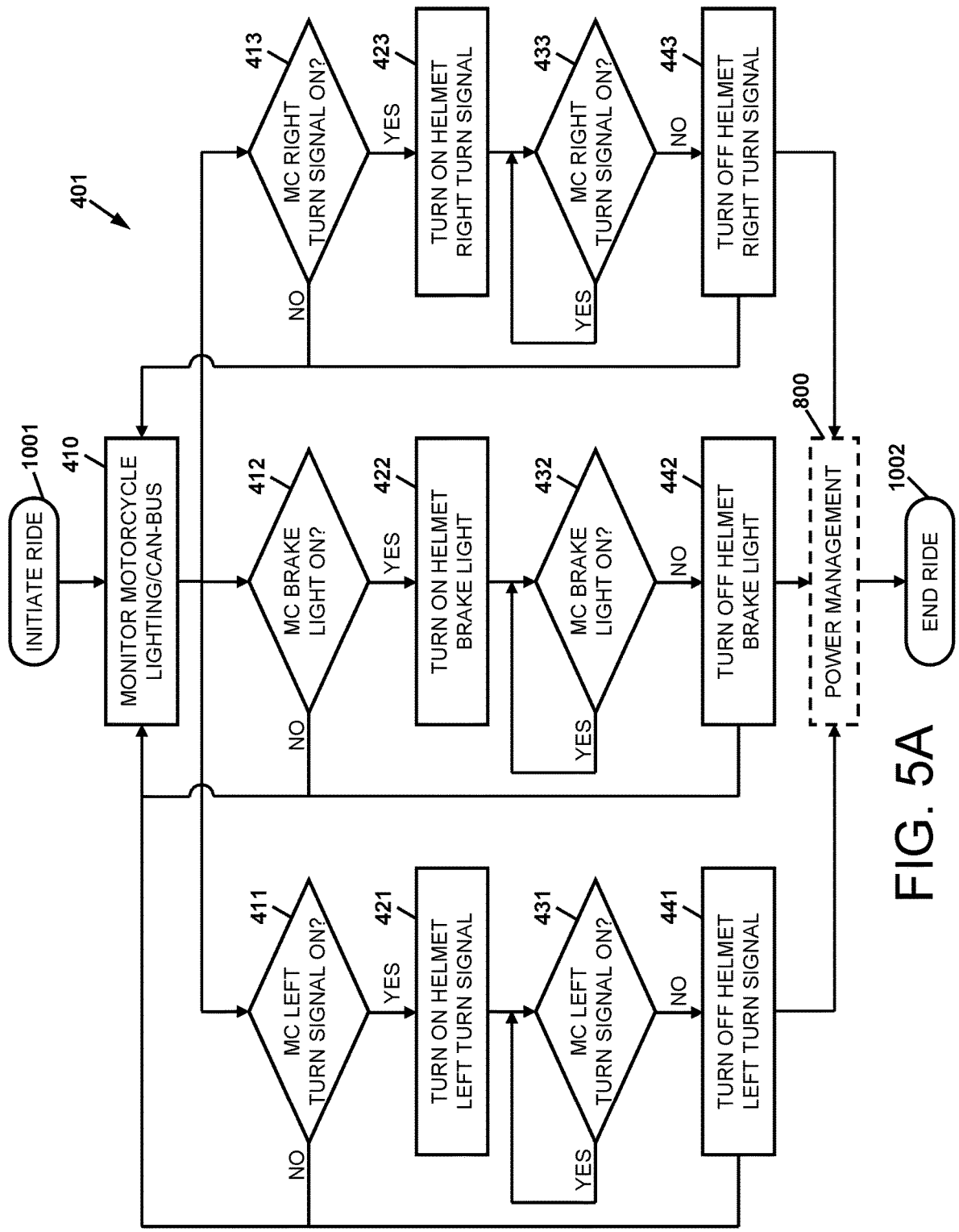
FIG. 5A is a flowchart depicting a method of operating lights in a safety lighting system in conjunction with a motorcycle equipped with analog lighting, or with a first type of digital lighting.

Referring to FIG. 5A, a method 401 of operating the helmet lighting 140 of the system 100 in conjunction with a motorcycle with analog lighting or with a first type of digital lighting, as described with reference to FIGS. 3A and 3B, is depicted. In the case of a motorcycle with analog lighting, the microcontroller monitors 410 the motorcycle lighting via the wiring arrangement shown in FIG. 3A and described previously. The microcontroller 111 checks 411 for left turn signal voltage or current, and if such is detected, the microcontroller turns on 421 the helmet left turn light 144L. The microcontroller 111 continues to check 431 for left turn signal voltage or current, and if such is detected, the helmet left turn light 144L is maintained on. If the microcontroller 111 detects that the left turn signal is off, the helmet left turn light 144L is turned off 441. In like manner, the microcontroller 111 checks 413 for right turn signal voltage or current, and if such is detected, the microcontroller turns on 423 the helmet right turn light 144R. The microcontroller 111 continues to check 433 for right turn signal voltage or current, and if such is detected, the helmet right turn light 144R is maintained on. If the microcontroller 111 detects that the right turn signal is off, the helmet right turn light 144R is turned off 443. In like manner, the microcontroller 111 checks 412 for brake light voltage or current, and if such is detected, the microcontroller 111 turns on 422 the helmet brake light 142. The microcontroller 111 continues to check 432 for brake light voltage or current, and if such is detected, the helmet brake light 142 is maintained on. If the microcontroller 111 detects that the brake light is off, the helmet brake light 142 is turned off 442. In a further embodiment, if the four-way flashers on the motorcycle are actuated, thus lighting the left and right turn signals 244L and 244R of the motorcycle, the microcontroller 111 detects this condition, and turns on the helmet left and right lights 144L and 144R.

For the operation of any of the helmet lights 144L, 142, or 144R, after such light is turned off, the cycle is repeated, with the microcontroller monitoring 410 the motorcycle lighting or CAN-Bus. However, at some point, in accordance with the power management method 800 to be described subsequently, if the microcontroller 111 detects no signals caused by operation of the motorcycle or by motion of the wearer of the helmet 10 after a predetermined and programmed period of time, the microcontroller 111 concludes that the ride has ended 1002, and the microcontroller 111 initiates a sleep mode 860 for the helmet portion 110 of the system 100 in order to conserve power in the battery 132.

In the case of a motorcycle with a first type of digital lighting, the microcontroller monitors 410 the motorcycle lighting via the wiring arrangement shown in FIG. 3B and described previously. The overall logic of the method 401 is the same as for a motorcycle with analog lighting, but the operation of the motorcycle left turn light 244L, brake light 242, and left turn light 244R are detected by the triggering of gates 194L, 192, and 194R, respectively, as described previously.

Figure 5B:
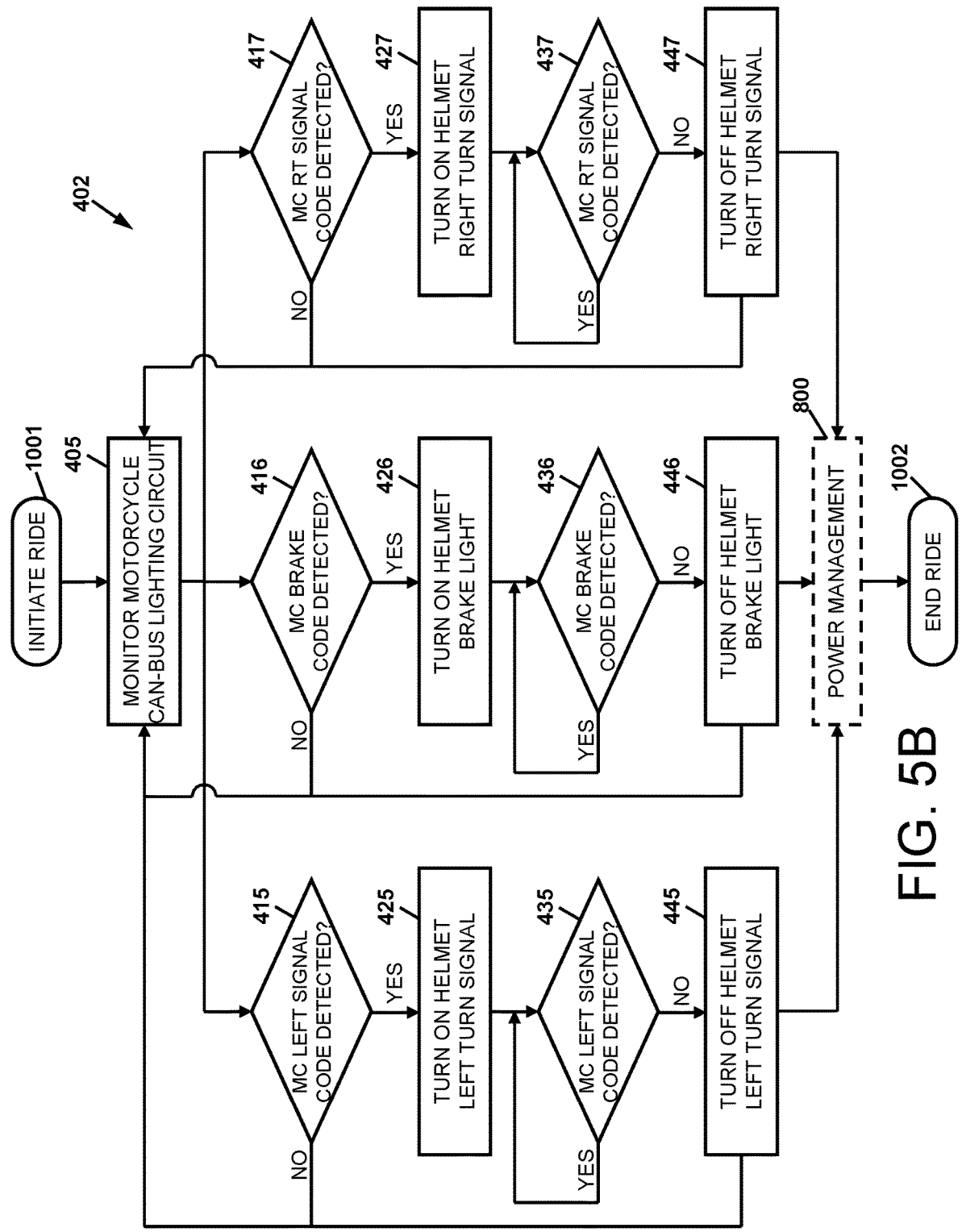
FIG. 5B is a flowchart depicting a method of operating lights in a safety lighting system in conjunction with a motorcycle equipped with a second type of digitally operated lighting.

Referring to FIG. 5B, a method 402 of operating the helmet lighting 140 of the system 100 in conjunction with a motorcycle with a second type of digital lighting, as described with reference to FIG. 3C, is depicted. The overall logic of the method 402 is similar to that for a motorcycle with analog lighting or Type 1 digital lighting, but the operation of the motorcycle left turn light 248L, brake light 246, and left turn light 248R are detected by monitoring 405 signals from the CAN-Bus 201 received through gate 195, and detecting whether or not the respective lighting codes are present.

The microcontroller 111 checks 415 for the left turn signal code, and if such code is detected, the microcontroller 111 turns on 425 the helmet left turn light 144L. The microcontroller 111 continues to check 435 for the left turn signal code, and if such code is detected, the helmet left turn light 144L is maintained on. If the microcontroller 111 detects that the left turn signal code is absent, the helmet left turn light 144L is turned off 445. In like manner, the microcontroller 111 checks 417 for the right turn signal code, and if such code is detected, the microcontroller 111 turns on 427 the helmet right turn light 144R. The microcontroller 111 continues to check 437 for the right turn signal code, and if such code is detected, the helmet right turn light 144R is maintained on. If the microcontroller 111 detects that the right turn signal code is absent, the helmet right turn light 144R is turned off 447. In like manner, the microcontroller 111 checks 416 for the brake light code, and if such code is detected, the microcontroller 111 turns on 426 the helmet brake light 142. The microcontroller 111 continues to check 436 for the brake light code, and if such code is detected, the helmet brake light 142 is maintained on. If the microcontroller 111 detects that the brake light code is absent, the helmet brake light 142 is turned off 446.

The microcontroller continues to monitor 405 the CAN-Bus, up until a point where no action by the motorcycle or rider is detected beyond a predetermined time, and the microcontroller 111 then concludes that the ride has ended, and initiates sleep mode 860 of the helmet portion 110 of the system 100.

Figure 6:
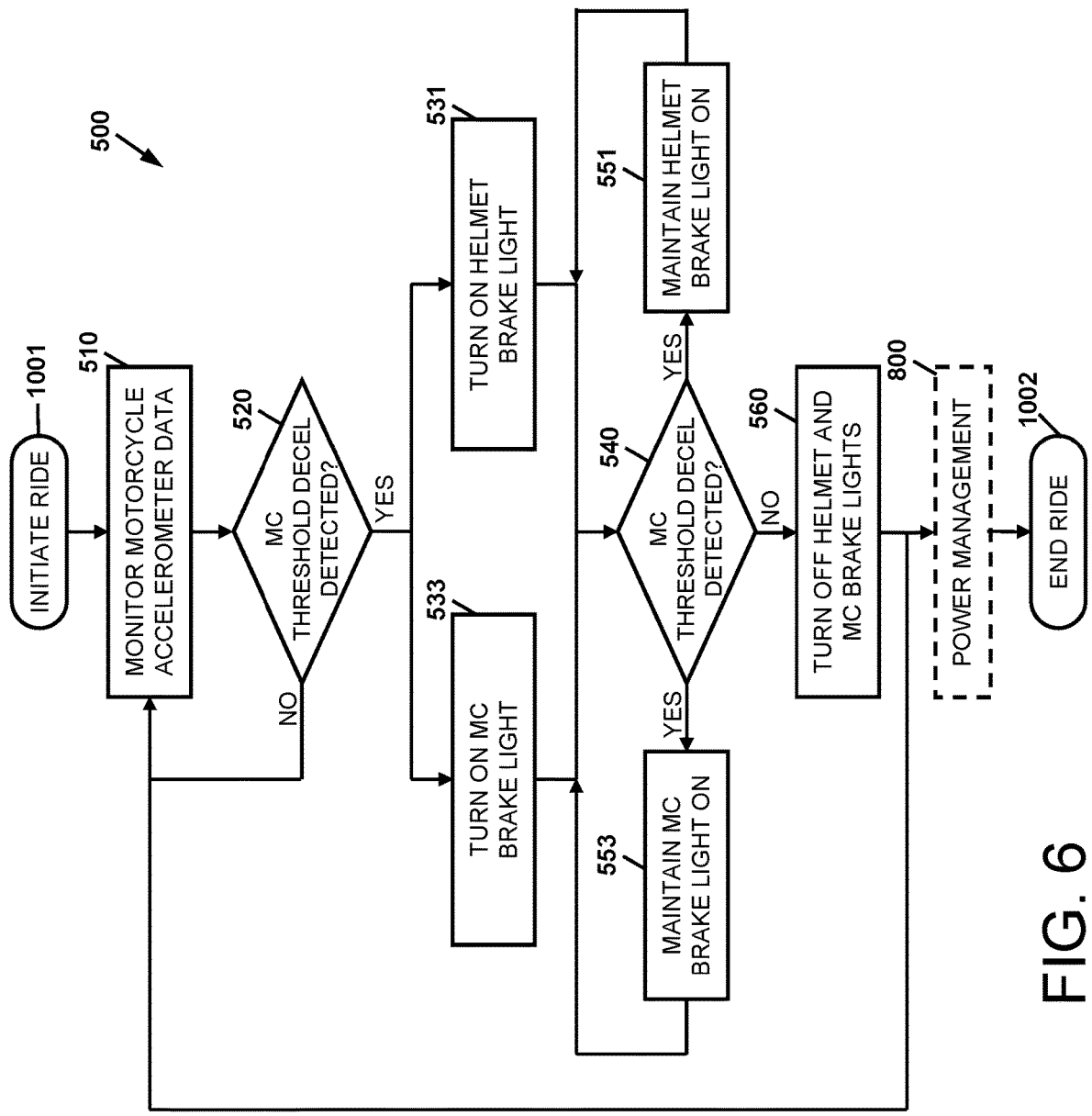
FIG. 6 is a flowchart depicting a method of operating a motorcycle brake light by the lighting system.

Referring to FIG. 6, a method 500 of operating a motorcycle light by the helmet portion 110 of the system 100, as described previously with reference to FIGS. 3A-3C, is depicted. The microcontroller 111 monitors 510 the motorcycle acceleration that is measured and communicated by the motorcycle accelerometer 180. If a level of deceleration (negative acceleration) is detected 520 that exceeds a predetermined threshold, the microcontroller 111 sends a signal via transceivers 150 and 170 to gate 173 to turn on 531 the motorcycle brake light 242 or 246. Additionally, the microcontroller 111 may also turn on 533 the helmet brake light 142. The microcontroller 111 continues to check 540 for deceleration that exceeds the threshold value, and if such deceleration is detected, motorcycle brake light 242 or 246 is maintained on 551, and the helmet brake light 142 is also maintained on 553. If the microcontroller 111 detects that deceleration above the threshold level is no longer occurring, the motorcycle brake light 242 or 246 and the helmet brake light 142 are turned off 560. The microcontroller 111 continues to monitor 510 the motorcycle accelerometer 180, up until a point where no action by the motorcycle or rider is detected beyond a predetermined time, and the microcontroller 111 then concludes that the ride has ended, and initiates sleep mode 860 of the helmet portion 110 of the system 100.

Figure 7:
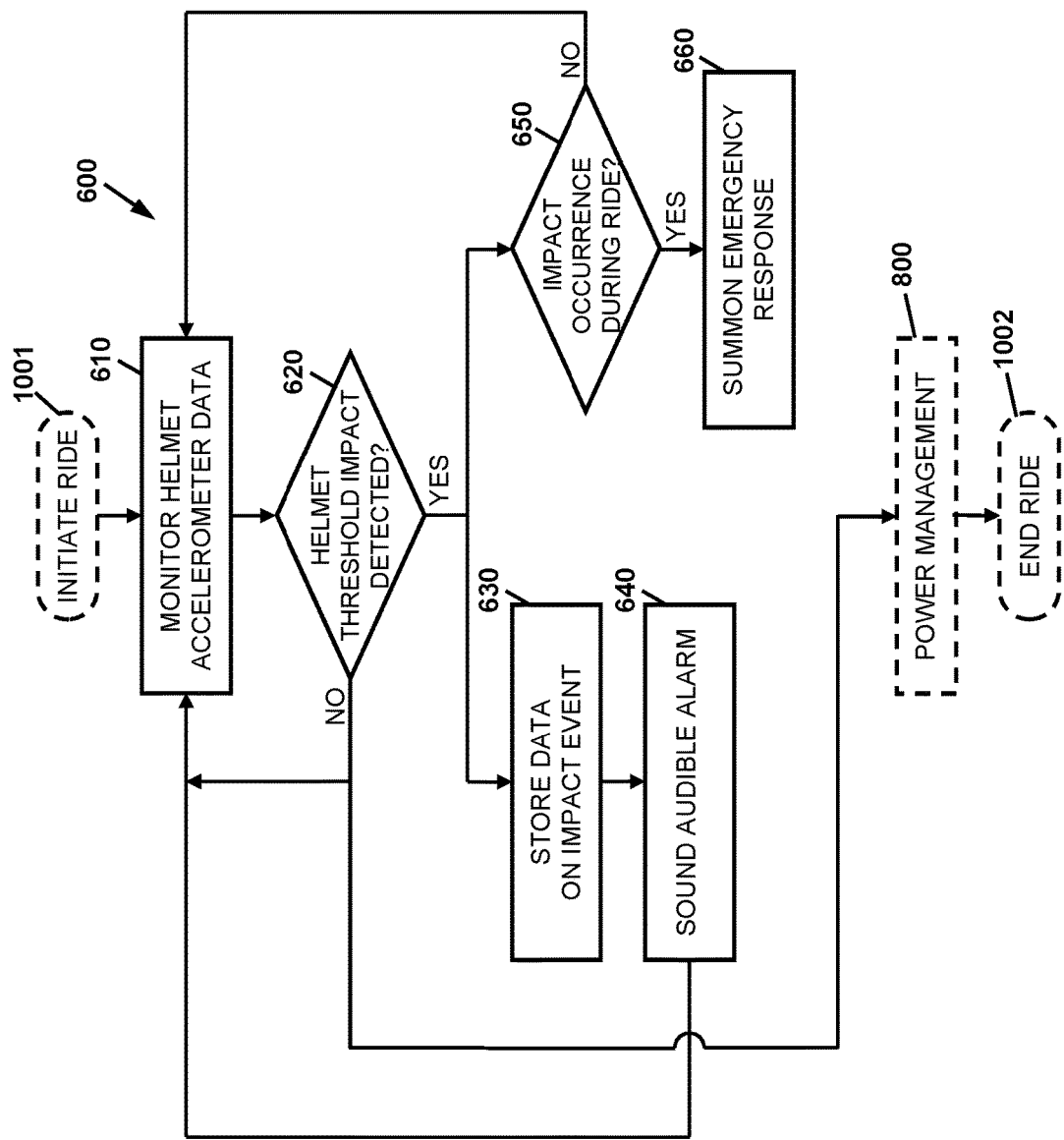
FIG. 7 is a flowchart depicting a method of detecting damage to a helmet using the safety lighting system of the present disclosure.

Referring to FIG. 7, a method 600 of detecting damage to a safety helmet 10 using the helmet portion 110 of the system 100 is depicted. The helmet damage detection method 600 may be performed after initiation 1001 of a ride, but the damage detection method may also be continued while the helmet portion 110 of the system 100 is in sleep mode 860. Under such conditions, the microcontroller 111 and accelerometer 117 in the helmet 10 may be supplied with power so that they remain capable of detecting an impact that could damage the helmet 10, such as if it were to fall off a storage shelf. The microcontroller 111 may be programmed to wake the helmet portion 110 of the system 100 substantially instantaneously upon the beginning of a free fall detected by the accelerometer 117, so that any helmet accelerometer data is acquired.

In either the case during a ride, or during sleep mode 860, the microcontroller 111 monitors 610 the acceleration that is measured and communicated by the helmet accelerometer 117. If a level of acceleration or deceleration is detected 620 that exceeds predetermined positive or negative thresholds, the microcontroller 111 stores 630 the acceleration data in the memory 120. Such data may be uploaded subsequently to a mobile device 30 or computer 20 for review and analysis in determining if the helmet 10 has likely been damaged, and is unsafe to use. Additionally, the microcontroller may sound an audible alarm 640 via speaker 119, alerting the wearer of the helmet 10 that a check for damage should be performed.

The microcontroller 111 is also programmed to determine 650 if the acceleration exceeding threshold has occurred during operation of the motorcycle. If this is the case, it is indicative of a crash of the motorcycle, with a substantial impact to the rider's helmet 10. Accordingly, the microcontroller 111 receives a reading of the location of the helmet from the GPS tracker 115, and summons 660 emergency response personnel.

Figure 8:
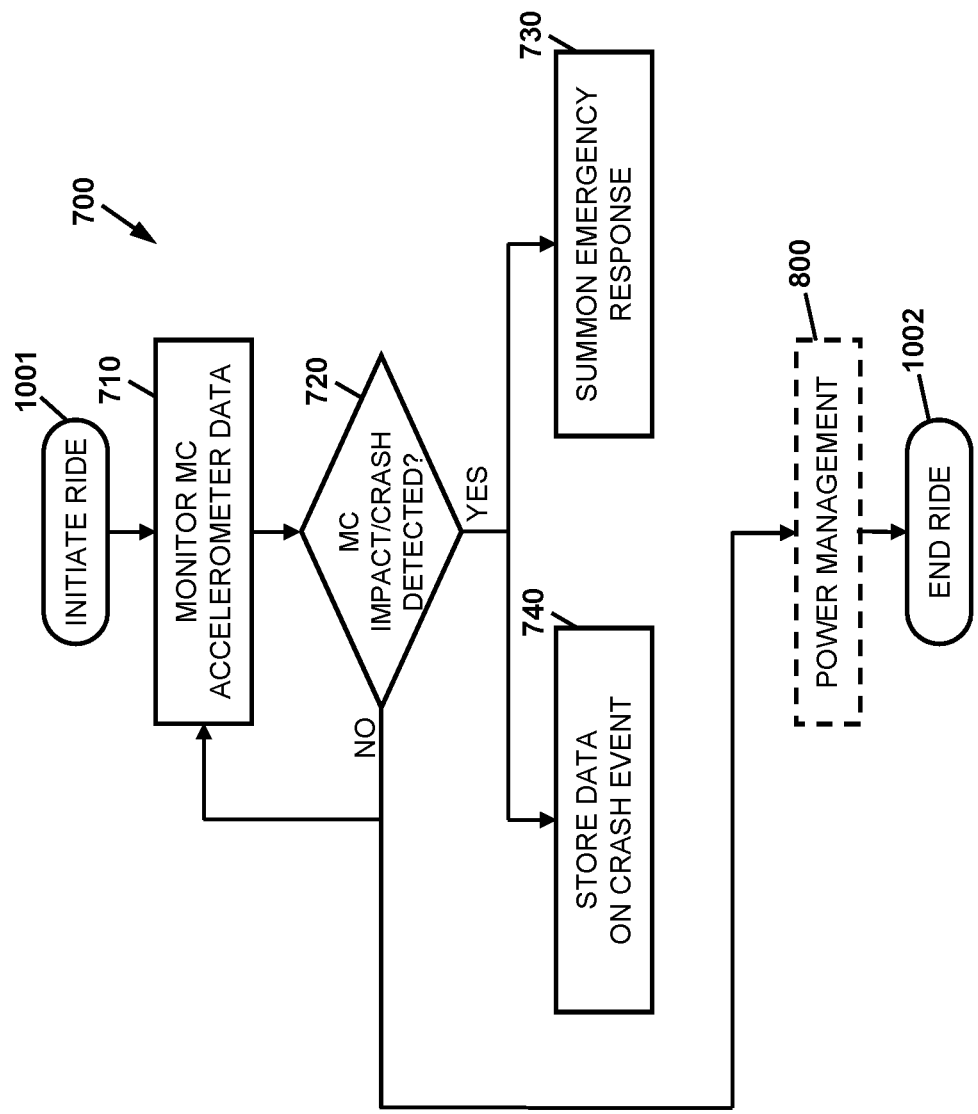
FIG. 8 is a flowchart depicting a method of detecting a crash of the motorcycle and its rider(s), and summoning emergency first responders using the safety lighting system.

Referring to FIG. 8, a method 700 of detecting a crash using the system 100 is depicted. The method is similar to that for detection of damage to the motorcycle helmet 10, but is performed using the motorcycle accelerometer 180 of the vehicle portion 160 of the system 100. The microcontroller 111 monitors 710 the acceleration that is measured and communicated by the motorcycle accelerometer 180. If a level of acceleration or deceleration is detected 720 that exceeds predetermined positive or negative thresholds, the microcontroller 111 receives a reading of the location of the helmet 10 from the GPS tracker 115, and summons 730 emergency response personnel. Additionally, the microcontroller 111 stores 740 the acceleration data in the memory 120.

Figure 9:
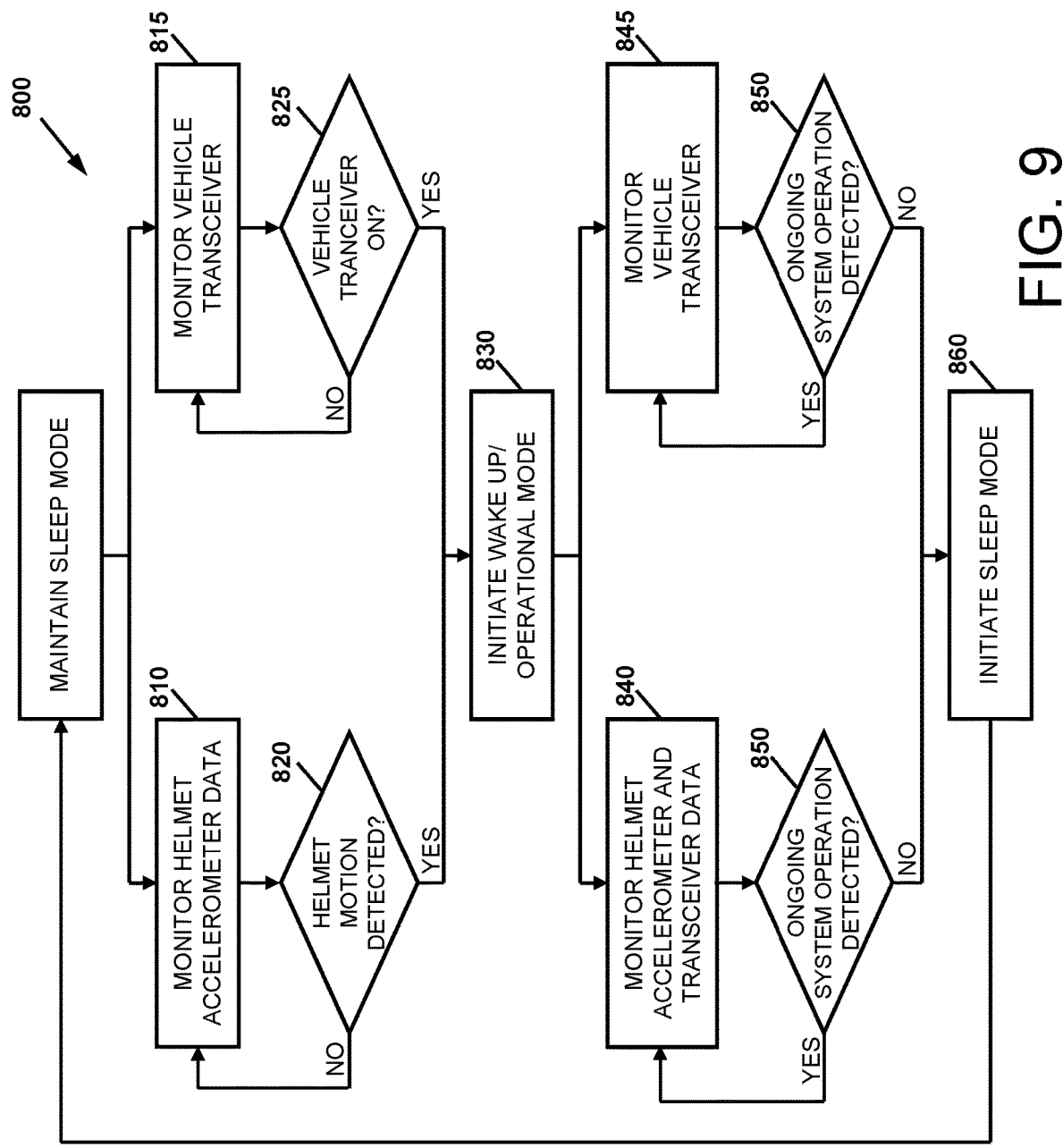
FIG. 9 is a flowchart depicting a method of managing power and conserving energy in order to extend battery life when using the safety lighting system.

Referring to FIG. 9, methods 800 of managing power and conserving energy in order to extend battery life of the lighting system 100 is depicted. It is noted that in the embodiments of the helmet portion 110 of the system 100 depicted herein, no on/off switch is provided for powering down the helmet portion 110 to conserve battery power. Thus the user of the helmet 10 does not need to remember to turn the helmet portion 110 off at the end of a ride (or deal with a dead battery 132 if he forgets to do so), or remember to turn the helmet portion 110 on at the start of a ride. Instead, the accelerometer 117 and microcontroller 111 in the helmet 10 are supplied with sufficient power even during sleep mode 860 so that they remain capable of detecting motion of the helmet 10.

Accordingly, in a first embodiment of the method 800, the microcontroller 111 monitors 810 the acceleration that is measured and communicated by the helmet accelerometer 117. If a level of acceleration or deceleration is detected 820 that indicates helmet motion, and thus a possible use of the helmet 10 by a wearer, the microcontroller 111 initiates 830 wake up mode in which certain system checks are performed as described previously. The helmet portion 110 of the system 100 is then ready for operation. During operation, the microcontroller 111 monitors 840 the helmet accelerometer 117, and also determines if motorcycle operational data is being received via transceivers 150 and 170. The microcontroller 111 detects 850 whether or not ongoing operation of the system 100 is occurring. If the microcontroller 111 detects no signals caused by operation of the motorcycle or by motion of the wearer of the helmet 10 after a predetermined and programmed period of time, the microcontroller 111 concludes that the ride has ended 1002, and the microcontroller 111 initiates a sleep mode 860 for the helmet portion 110 of the system 100 in order to conserve power in the battery 132.

In a second embodiment of the method 800, even while the helmet portion of the auxiliary lighting system is in sleep mode, the microcontroller 111 and helmet transceiver 150 remain powered. The energy consumption of these devices is very small with respect to overall battery energy capacity and life. Thus in sleep mode, the helmet transceiver 150 and microcontroller remain capable of monitoring 815 the vehicle transceiver 170. Sleep mode continues as long as the motorcycle is not "turned on," as indicated by the ignition switch (which may energize the CAN-BUS), the brake light 246, and/or one or both turn signal lights 248L and 248R. When the motorcycle is turned on, the vehicle transceiver 170 sends a signal to the helmet transceiver 150 and to the microcontroller 111. The microcontroller 111 detects 825 that the vehicle transceiver 170 is on and initiates 830 wake up and operational modes of the system, and the helmet portion 110 of the system 100 is then ready for operation. During operation, the microcontroller 111 monitors 845 the vehicle transceiver 170, and may also determines if operational data is being received via transceivers 150 and 170. The microcontroller 111 detects 850 whether or not ongoing operation of the system 100 is occurring, and if not, sleep mode is initiated as described above.

It is therefore apparent that there has been provided, in accordance with the present disclosure, an auxiliary safety lighting system for use in conjunction with a vehicle, and methods for operation of the safety lighting system. The foregoing description of technology and the invention is merely exemplary in nature of the subject matter, manufacture, and use of the invention and is not intended to limit the scope, application, or uses of any specific invention claimed in this application or in such other applications as may be filed claiming priority to this application, or patents issuing therefrom. The following definitions and non-limiting guidelines must be considered in reviewing the description.

The headings in this disclosure (such as "Background" and "Summary") and sub-headings used herein are intended only for general organization of topics within the present technology, and are not intended to limit the disclosure of the present technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

To the extent that other references may contain similar information in the Background herein, said statements do not constitute an admission that those references are prior art or have any relevance to the patentability of the technology disclosed herein. Any discussion in the Background is intended merely to provide a general summary of assertions.

The description and specific examples, while indicating embodiments of the technology disclosed herein, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

To the extent employed herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

Unless otherwise specified, relational terms used in the present disclosure should be construed to include certain tolerances that those skilled in the art would recognize as providing equivalent functionality. By way of example, the term perpendicular is not necessarily limited to 90.00°, but also to any variation thereof that those skilled in the art would recognize as providing equivalent functionality for the purposes described for the relevant member or element. Terms such as "about" and "substantially" in the context of configuration relate generally to disposition, location, and/or configuration that is either exact or sufficiently close to the location, disposition, or configuration of the relevant element to preserve operability of the element within the invention while not materially modifying the invention. Similarly, unless specifically specified or clear from its context, numerical values should be construed to include certain tolerances that those skilled in the art would recognize as having negligible importance, as such do not materially change the operability of the invention.

As used herein, the words "comprise," "include," "contain," and variants thereof are intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Having thus described the basic concept of the invention, it will be apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be expressly stated in the claims.

What is claimed is:

1. An auxiliary lighting system for a helmet operable in conjunction with a vehicle lighting system comprising a battery and a vehicle brake light, the auxiliary lighting system comprising:
    a) a helmet portion comprising:
        a helmet electrical power supply;
        a helmet lighting unit connected to the power supply and comprising at least a helmet brake light;
        a helmet microcontroller connected to the helmet electrical power supply and in signal communication with the helmet brake light; and
        a helmet transceiver in signal communication with the helmet microcontroller; and
    b) a vehicle portion comprising:
        a vehicle transceiver in wireless signal communication with the helmet transceiver; and
        a first gate in communication with the vehicle transceiver, and under a condition when an electrical signal is received from the vehicle transceiver, operable to electrically connect the battery to the vehicle brake light; and c) an accelerometer in signal communication with the helmet microcontroller, and operable to send a signal indicative of vehicle acceleration to the helmet microcontroller;

wherein the helmet microcontroller is programmed with an algorithm such that when executed, when a level of deceleration of the vehicle greater than or equal to a predetermined threshold level of deceleration is sensed by the accelerometer, the helmet microcontroller receives a signal from the accelerometer indicative of the threshold level of deceleration being met or exceeded, and executes an algorithm, to send a signal to the helmet transceiver, and on to the vehicle transceiver, and on to the first gate, to electrically connect the battery to the vehicle brake light, and cause the vehicle brake light to be illuminated.

2. The auxiliary lighting system of claim 1, wherein when the threshold level of deceleration is exceeded, the helmet microcontroller causes the helmet brake light to be illuminated.

3. The auxiliary lighting system of claim 1, wherein the vehicle portion of the auxiliary lighting system is comprised of a supplemental vehicle brake light and a second gate, and wherein when the threshold level of deceleration is met or exceeded, the helmet microcontroller sends a signal to the helmet transceiver, and on to the vehicle transceiver, and on to the second gate, operating to electrically connect the battery to the supplemental vehicle brake light, and cause the supplemental vehicle brake light to be illuminated.

4. An auxiliary lighting system for a helmet operable in conjunction with a vehicle lighting system comprising a battery, a vehicle lighting processor in electrical communication with a brake application sensor and with a vehicle brake light, the vehicle lighting processor configured to execute a power algorithm to supply electrical power through a conductor connected to the vehicle brake light and cause illumination of the vehicle brake light when a signal is received by the vehicle lighting processor from the brake application sensor indicative of an application of a vehicle brake, and a fault algorithm to detect absence or presence of a brake fault in the electrical communication with the vehicle brake light, the auxiliary lighting system comprising:

a) a helmet portion comprising:
a helmet electrical power supply;
a helmet lighting unit connected to the power supply and comprising at least a helmet brake light;
a helmet microcontroller connected to the power supply and in signal communication with the helmet brake light; and
a helmet transceiver in signal communication with the helmet microcontroller; and b) a vehicle portion comprising:
a vehicle transceiver in wireless signal communication with the helmet transceiver; and
a first gate in communication with the vehicle transceiver, and connected to the electrical conductor supplying electrical power to the vehicle brake light;
wherein an electrical signal indicative of illumination of the vehicle brake light is communicable through the first gate to the vehicle transceiver while maintaining absence of the brake fault in the electrical communication with the vehicle brake light, and on to the helmet transceiver, and to the helmet microcontroller, and wherein the helmet microcontroller is programmed with an algorithm to cause the helmet brake light of the auxiliary lighting system to be illuminated when the electrical signal indicative of illumination of the vehicle brake light is communicated.

5. The auxiliary lighting system of claim 4, wherein the vehicle lighting system is further comprised of a vehicle left directional light and a vehicle right directional light, and the auxiliary lighting system is further comprised of:

a helmet left directional light in the helmet portion and in signal communication with the helmet microcontroller;
a helmet right directional light in the helmet portion and in signal communication with the helmet microcontroller;
a second gate in communication with the vehicle transceiver, and connected to an electrical conductor supplying electrical power to the vehicle left directional light, wherein an electrical signal indicative of illumination of the vehicle left directional light is communicable through the second gate to the vehicle transceiver while maintaining absence of a left directional light fault in electrical communication of the vehicle lighting processor with the vehicle left directional light, and on to the helmet transceiver, and to the helmet microcontroller, and wherein the helmet microcontroller is programmed with an algorithm to cause the helmet left directional light to be illuminated when the electrical signal indicative of illumination of the vehicle left directional light is communicated; and
a third gate in communication with the vehicle transceiver, and connected to an electrical conductor supplying electrical power to the vehicle right directional light, wherein an electrical signal indicative of illumination of the vehicle right directional light is communicable through the third gate to the vehicle transceiver while maintaining absence of a right directional light fault in electrical communication of the vehicle lighting processor with the vehicle right directional light, and on to the helmet transceiver, and to the helmet microcontroller, and wherein the helmet microcontroller is programmed with an algorithm to cause the helmet right directional light to be illuminated when the electrical signal indicative of illumination of the vehicle right directional light is communicated.

6. The auxiliary lighting system of claim 4, further comprising an accelerometer in signal communication with the vehicle transceiver, and operable to send a signal indicative of vehicle acceleration to the vehicle transceiver.

7. The auxiliary lighting system of claim 6, wherein the helmet microcontroller is programmed with an algorithm such that when executed, when a level of deceleration of the vehicle greater than or equal to a predetermined threshold level of deceleration is sensed by the accelerometer, the helmet microcontroller receives a signal from the accelerometer indicative of the threshold level of deceleration being met or exceeded, and executes an algorithm, to send a signal to the helmet transceiver, and on to the vehicle transceiver, and on to the first gate, to electrically connect the battery to the vehicle brake light, and cause the vehicle brake light to be illuminated.

8. The auxiliary lighting system of claim 7, wherein the accelerometer is included in the vehicle portion of the auxiliary lighting system, and wherein the signal indicative of vehicle acceleration from the accelerometer is communicable to the vehicle transceiver, to the helmet transceiver, and to the helmet microcontroller.

9. The auxiliary lighting system of claim 7, wherein the vehicle portion of the auxiliary lighting system is further comprised of a supplemental vehicle brake light and a second gate, and wherein when the threshold level of deceleration is exceeded, the helmet microcontroller sends a signal to the helmet transceiver, and on to the vehicle transceiver, and on to the second gate operating to electrically connect the battery to the supplemental vehicle brake light, and cause the supplemental vehicle brake light to be illuminated.

10. The auxiliary lighting system of claim 4, wherein the vehicle lighting processor of the vehicle lighting system is configured to simultaneously provide electrical power and an encoded vehicle braking signal indicative of application of the vehicle brake to the vehicle brake light when the signal is received by the vehicle lighting processor from the brake application sensor indicative of an application of the vehicle brake, and the vehicle brake light is operable to detect the encoded vehicle braking signal and cause illumination of the vehicle brake light when the encoded vehicle braking signal is present, and wherein the encoded vehicle braking signal indicative of illumination of the vehicle brake light is communicable through the first gate to the vehicle transceiver while maintaining the absence of the brake fault in the electrical communication with the vehicle brake light, and on to the helmet transceiver, and to the helmet microcontroller, and wherein the helmet microcontroller is programmed with an algorithm to cause the helmet brake light of the auxiliary lighting system to be illuminated.

11. The auxiliary lighting system of claim 6, wherein the helmet microcontroller is programmed with an algorithm such that when executed, when a level of deceleration of the vehicle greater than or equal to a predetermined threshold level of deceleration is sensed by the accelerometer, the helmet microcontroller receives a signal from the accelerometer indicative of the threshold level of deceleration being met or exceeded, and executes an algorithm, causing the helmet brake light to be illuminated.

12. An auxiliary lighting system for a helmet operable in conjunction with a vehicle lighting system comprising a battery, a vehicle brake light, and a vehicle lighting processor in electrical communication with a brake application sensor and with the vehicle brake light, the vehicle lighting processor configured to simultaneously provide electrical power and an encoded vehicle braking signal indicative of application of the vehicle brake to the vehicle brake light when the signal is received by the vehicle lighting processor from the brake application sensor indicative of an application of the vehicle brake, and the vehicle brake light is operable to detect the encoded vehicle braking signal and cause illumination of the vehicle brake light when the encoded vehicle braking signal is present, the auxiliary lighting system comprising:
  a) a helmet portion comprising:
    a helmet electrical power supply;
    a helmet lighting unit connected to the power supply and comprising at least a helmet brake light;
    a helmet microcontroller connected to the power supply and in signal communication with the helmet brake light; and
    a helmet transceiver in signal communication with the helmet microcontroller; and
  b) a vehicle portion comprising:
    a vehicle transceiver in wireless signal communication with the helmet transceiver; and
    a first gate in signal communication with the vehicle transceiver and in signal communication with the vehicle lighting processor, and operable to pass the encoded vehicle braking signals to the vehicle transceiver, on to the helmet transceiver, and on to the helmet microcontroller when the vehicle lighting processor communicates the encoded vehicle braking signal to the first gate;
    wherein the helmet microcontroller is programmed with an algorithm such that when executed, when the encoded vehicle braking signal is received by the helmet microcontroller, the helmet microcontroller causes the helmet brake light to be illuminated.

13. The auxiliary lighting system of claim 12, wherein:
  the vehicle lighting system is further comprised of a vehicle left directional light and a vehicle right directional light, and the vehicle lighting processor is programmed with an algorithm to simultaneously provide electrical power and an encoded left turn signal to the vehicle left directional light when a left turn signal is received by the vehicle lighting processor from a left turn signal sensor, and the left directional light is operable to detect the encoded left turn signal and cause illumination of the left directional light when the encoded left turn signal is present, and to simultaneously provide electrical power and an encoded right turn signal to the vehicle right directional light when a right turn signal is received by the vehicle lighting processor from a right turn signal sensor, and the right directional light is operable to detect the encoded right turn signal and cause illumination of the right directional light when the encoded right turn signal is present;
  the helmet lighting system is further comprised of a helmet left directional light, and a helmet right directional light; and
  the helmet microcontroller is programmed with an algorithm such that when executed, when the encoded left turn signal is received by the helmet microcontroller, the helmet microcontroller causes the helmet left directional light to be illuminated, and when the encoded right turn signal is received by the helmet microcontroller, the helmet microcontroller causes the helmet right directional light to be illuminated.

14. The auxiliary lighting system of claim 12, further comprising an accelerometer in signal communication with the helmet microcontroller, and operable to send a signal indicative of vehicle acceleration to the helmet microcontroller, wherein the helmet microcontroller is programmed with an algorithm such that when executed, when a level of deceleration of the vehicle greater than or equal to a predetermined threshold level of deceleration is sensed by the accelerometer, the helmet microcontroller receives a signal from the accelerometer indicative of the threshold level of deceleration being met or exceeded, and causes the helmet brake light to be illuminated.

15. The auxiliary lighting system of claim 14, further comprising a second gate in signal communication with the vehicle transceiver and in signal communication with the vehicle lighting processor and the vehicle brake light, and operable to pass encoded signals to the vehicle lighting processor, wherein the helmet microcontroller is programmed with an algorithm such that when executed, when the accelerometer communicates to the helmet microcontroller that the level of deceleration of the vehicle is greater than or equal to the predetermined threshold level of deceleration, the helmet microcontroller communicates the encoded vehicle braking signal to the helmet transceiver, to the vehicle transceiver, to the third gate, and to the processor and vehicle brake light, causing the vehicle brake light to be illuminated.

16. The auxiliary lighting system of claim 14, wherein the accelerometer is included in the vehicle portion of the auxiliary lighting system and is in communication with the vehicle transceiver, and wherein a signal indicative of vehicle acceleration from the accelerometer is communicable to the vehicle transceiver, to the helmet transceiver, and to the helmet microcontroller.

17. The auxiliary lighting system of claim 12, wherein:
the vehicle portion of the auxiliary lighting system is comprised of a second gate and a supplemental brake light;
the auxiliary lighting system is further comprised of an accelerometer in signal communication with the helmet microcontroller and operable to send a signal indicative of vehicle acceleration to the helmet microcontroller, and
the helmet microcontroller is programmed with an algorithm such that when executed, when a level of deceleration of the vehicle greater than or equal to a predetermined threshold level of deceleration is sensed by the accelerometer, the helmet microcontroller receives a signal from the accelerometer indicative of the threshold level of deceleration being met or exceeded, and sends a signal to the helmet transceiver, and on to the vehicle transceiver, and on to second the gate, to electrically connect the battery to the supplemental brake light, and cause the supplemental brake light to be illuminated.

18. The auxiliary lighting system of claim 17, wherein the accelerometer is included in the vehicle portion of the auxiliary lighting system and is in communication with the vehicle transceiver, and wherein the signal indicative of vehicle acceleration from the accelerometer is communicable to the vehicle transceiver, to the helmet transceiver, and to the helmet microcontroller.

19. The auxiliary lighting system of claim 12, wherein the vehicle lighting processor is configured to execute a fault algorithm to detect absence or presence of a brake fault in the electrical communication with the vehicle brake light, and wherein the encoded vehicle braking signal indicative of illumination of the vehicle brake light is communicable through the first gate to the vehicle transceiver while maintaining absence of the brake fault in the electrical communication with the vehicle brake light.

20. The auxiliary lighting system of claim 14, wherein the accelerometer is contained in the helmet.

\* \* \* \* \*